United States Patent
Meiri et al.

(10) Patent No.: US 11,874,740 B2
(45) Date of Patent: Jan. 16, 2024

(54) TECHNIQUES FOR AVOIDING AND REDUCING DATA UNAVAILABILITY

(71) Applicant: Dell Products L.P., Hopkinton, MA (US)

(72) Inventors: David Meiri, Somerville, MA (US); Dmitry Tylik, Westborough, MA (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 17/557,656

(22) Filed: Dec. 21, 2021

(65) Prior Publication Data

US 2023/0195575 A1 Jun. 22, 2023

(51) Int. Cl.
*G06F 11/07* (2006.01)
*G06F 11/10* (2006.01)
*G06F 11/16* (2006.01)
*G06F 3/06* (2006.01)

(52) U.S. Cl.
CPC .......... *G06F 11/1092* (2013.01); *G06F 3/067* (2013.01); *G06F 3/0619* (2013.01); *G06F 3/0659* (2013.01); *G06F 3/0689* (2013.01); *G06F 11/0772* (2013.01); *G06F 11/1658* (2013.01)

(58) Field of Classification Search
CPC .......... G06F 11/1092; G06F 11/1658
USPC ...................................... 714/6.24
See application file for complete search history.

(56) References Cited

U.S. PATENT DOCUMENTS

| | | | |
|---|---|---|---|
| 11,347,607 B1* | 5/2022 | Tylik | G06F 11/2079 |
| 2011/0093854 A1* | 4/2011 | Blanc | G06F 9/5066 718/101 |
| 2013/0067159 A1* | 3/2013 | Mehra | G06F 11/1451 711/E12.019 |
| 2020/0226145 A1* | 7/2020 | Meiri | G06F 3/0604 |

(Continued)

OTHER PUBLICATIONS

Dmitry Nikolayevich Tylik, et al., "Data Storage Cluster With Witness Node for Selecting Surviving Storage Node After Replication Failure," U.S. Appl. No. 17/232,292, filed Apr. 16, 2021.

(Continued)

*Primary Examiner* — Chae M Ko
(74) *Attorney, Agent, or Firm* — Muirhead and Saturnelli, LLC

(57) ABSTRACT

A clustered pair of storage systems configured for active-active bidirectional synchronous replication expose a stretched volume over paths to both storage systems. Writes to the stretched volume received at each system are replicated to the peer system. The cluster can use a time-to-live (TTL) mechanism by which a non-preferred system continuously requests a TTL grant from the preferred system to remain in the cluster. Algorithms that reduce or avoid data unavailability are described and can include assessing the health of the systems in the cluster. An unhealthy system can trigger a one-sided polarization algorithm to notify the peer system that it is polarization winner. An improved polarization technique using a witness to decide the polarization winner includes a system adding a time delay before contacting the witness if the system is unhealthy. A control component can detect an unhealthy system and disable the active-active bidirectional synchronous replication.

18 Claims, 14 Drawing Sheets

(56) References Cited

U.S. PATENT DOCUMENTS

| | | | |
|---|---|---|---|
| 2021/0089400 A1* | 3/2021 | Kashani | G06F 11/1492 |
| 2023/0009529 A1* | 1/2023 | Meiri | G06F 3/065 |
| 2023/0019241 A1* | 1/2023 | Meiri | G06F 3/0637 |

OTHER PUBLICATIONS

David Meiri, "Storage Systems Configured With Time-to-Live Clustering for Replication in Active-Active Configuration," U.S. Appl. No. 16/246,984, filed Jan. 14, 2019.

* cited by examiner

TECHNIQUES FOR AVOIDING AND REDUCING DATA UNAVAILABILITY

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: configuring a stretched volume from two volumes of two data storage systems configured as a cluster, wherein each of the two volumes is included in a different one of the two data storage systems, wherein the two volumes configured as the stretched volume are exposed to a host as a same logical volume having a same first identifier over a plurality of paths from the two data storage systems, wherein the two volumes are configured for bidirectional synchronous replication between the two data storage systems whereby a write directed to the stretched volume received at any one of the two data storage systems is synchronously replicated to the other one of the two data storage systems of the cluster; determining that a first of the two data storage systems is unhealthy; and responsive to determining that the first data storage system is unhealthy, performing first processing including: disabling the bidirectional synchronous replication between the two data storage systems; and notifying, by the first data storage system, a second of the two data storage systems that the second data storage system is selected as a single survivor system to service I/O requests directed to the stretched volume without replicating write requests to the first data storage system.

In at least one embodiment, determining the first data storage system is unhealthy can include determining that the first data storage system is experiencing an internal system failure. The internal system failure of the first data storage system can be one of a plurality of defined system failures that includes one or more of: a first defined system failure resulting in the first data storage system not able to service write requests and able to service read requests for existing data stored on the first data storage system; a second defined system failure resulting in the first data storage system not able to service read requests to read existing data stored on the first data storage system and able to service write requests; and a third defined system failure resulting in the first data storage system not being able to service any I/O operations. The first defined system failure can include any of: an out of disk space failure where the first data storage system has no free or available non-volatile back end storage for storing new data; an out of cache storage failure where the first data storage system cannot service new writes since there is no available cache to store new data written by the new writes; and an out of journal or log space failure where the first data storage system cannot service new writes since the new writes cannot be recorded in a log. The second defined system failure can include any of: a double disk failure in a RAID-5 disk layout of back end non-volatile storage, where the first data storage system services new writes by writing new data to healthy back end non-volatile storage, and where the first data storage system has existing data stored on failed backend non-volatile storage that cannot be read or recovered; and a metadata corruption of metadata used to access stored data on back end non-volatile storage, where the metadata used to access the stored data is corrupted and cannot be used to retrieve the stored data, and where the metadata is used to map a logical address to its corresponding physical address on back end non-volatile storage. The third defined system failure can include any of: an internal network failure resulting in the first data storage system being unable to access non-volatile backend storage including stored data and metadata; and a double node failure within the first data storage system where no processor is available to service I/O requests.

In at least one embodiment, the cluster can use a time-to-live (TTL) mechanism by which a preferred one of the two data storage systems communicates permission for continued operation in the cluster to a non-preferred one of the two data storage systems in response to TTL requests from the non-preferred data storage system. The first data storage system can be the preferred data storage system, the second data storage system can be the non-preferred data storage system, and the TTL mechanism can include a TTL timer at the non-preferred data storage system which is refreshed by each grant of TTL permission from the preferred data storage system, and a corresponding tracking timer at the preferred data storage system can track operation of the TTL timer.

In at least one embodiment, the first processing can include the first data storage system, as the preferred data storage system, not granting any TTL requests sent from the second data storage system as the non-preferred data storage system; and the first data storage system rejecting and not servicing I/O operations received.

Various embodiments of the techniques of the present disclosure can include a computer-implemented method, a system and a non-transitory computer readable medium comprising: configuring a stretched volume from two volumes of two data storage systems configured as a cluster, wherein each of the two volumes is included in a different one of the two data storage systems, wherein the two volumes configured as the stretched volume are exposed to a host as a same logical volume having a same first identifier over a plurality of paths from the two data storage systems, wherein the two volumes are configured for bidirectional synchronous replication between the two data storage systems whereby a write directed to the stretched volume received at any one of the two data storage systems is synchronously replicated to the other one of the two data storage systems of the cluster; and responsive to detecting an occurrence of a trigger condition, triggering first polarization processing for a first of the two data storage system, wherein said first polarization processing includes: determining that the first data storage system is unhealthy; and responsive to determining that the first data storage system is unhealthy, performing first processing including: declaring that the first data storage system is a loser of polarization; disabling the bidirectional synchronous replication between the two data storage systems; the first data storage system rejecting received I/Os; and setting paths to the first data storage system over which one or more volumes including the stretched volume are exposed to unavailable.

In at least one embodiment, the first processing can include sending a message from the first data storage system to the second data storage system, wherein the message can indicate that the second data storage system is a winner of polarization whereby the second data storage system is designated as a single surviving system of the cluster that services I/Os, and wherein the message can indicate that bidirectional synchronous replication for any configured stretched volume including the stretched volume is disabled.

In at least one embodiment, the cluster can use a time-to-live (TTL) mechanism by which a preferred one of the two data storage systems communicates permission for continued operation in the cluster to a non-preferred one of the two data storage systems in response to TTL requests from the non-preferred data storage system. The first data storage system can be the preferred data storage system, and the first processing can include the first data storage system not granting any TTL requests received from the second data storage system, which is the non-preferred data storage system, and wherein the trigger condition can be expiration of the TTL granted to the second data storage system or failure to replicate writes of the stretched volume from the first data storage system to the second data storage system. The first data storage system can be the non-preferred data storage system, and the first processing can include the first data storage system not sending any TTL requests to the second data storage system, which is the non-preferred data storage system, and wherein the trigger condition can include failure to replicate writes of the stretched volume from the first data storage system to the second data storage system or expiration of the TTL granted to the first data storage system due to failure to receive a renewed TTL grant response from the second data storage system.

In at least one embodiment, determining the first data storage system is unhealthy can include determining that the first data storage system is experiencing an internal system failure that is one of a plurality of defined system failures. The plurality of defined system failures can include one or more of: a first defined system failure resulting in the first data storage system not able to service write requests and able to service read requests for existing data stored on the first data storage system; a second defined system failure resulting in the first data storage system not able to service read requests to read existing data stored on the first data storage system and able to service write requests; and a third defined system failure resulting in the first data storage system not being able to service any I/O operations.

Various embodiments of the techniques of the present disclosure can include a computer-implemented method, a system and a non-transitory computer readable medium comprising: configuring a stretched volume from two volumes of two data storage systems configured as a cluster, wherein each of the two volumes is included in a different one of the two data storage systems, wherein the two volumes configured as the stretched volume are exposed to a host as a same logical volume having a same first identifier over a plurality of paths from the two data storage systems, wherein the two volumes are configured for bidirectional synchronous replication between the two data storage systems whereby a write directed to the stretched volume received at any one of the two data storage systems is synchronously replicated to the other one of the two data storage systems of the cluster; responsive to detecting an occurrence of a trigger condition, triggering first polarization processing for a first of the two data storage system, wherein said first polarization processing includes: determining that the first data storage system is unhealthy; responsive to determining that the first data storage system is unhealthy, performing first processing including: determining a first amount of time denoting an intentional time delay, wherein the first amount of time includes a first time delay due the first data storage system being unhealthy; waiting an amount of time that includes the first amount of time; subsequent to said waiting, sending a request to a witness requesting that the first data storage system be declared a polarization winner; and responsive to said request, receiving a response from the witness, wherein the response indicates whether the first data storage system is the polarization winner selected as the sole surviving system to service I/Os without replicating writes of the stretched volume to the second data storage system, or a polarization loser that is evicted from the cluster and rejects I/Os.

In at least one embodiment, the cluster can use a time-to-live (TTL) mechanism by which a preferred one of the two data storage systems communicates permission for continued operation in the cluster to a non-preferred one of the two data storage systems in response to TTL requests from the non-preferred data storage system, and wherein the amount of time can further include a second amount of time if the first data storage system is designated as a non-preferred system, and wherein the request can be sent to the witness after expiration of the TTL of the non-preferred system. The first data storage system can be the preferred data storage system, and the first processing can include the first data storage system not granting any TTL requests received from the second data storage system, which is the non-preferred data storage system. The trigger condition can be expiration of the TTL granted to the second data storage system or failure to replicate writes of the stretched volume from the first data storage system to the second data storage system.

In at least one embodiment, processing can include, responsive to detecting an occurrence of the trigger condition, triggering second polarization processing for the second data storage system. The second polarization processing can include: determining that the second data storage system is not unhealthy; waiting a third amount of time, wherein the third amount of time includes the second amount of time since the second data storage system is the non-preferred data storage system; subsequent to said waiting, sending a second request to the witness requesting that the second data storage system be declared the polarization winner; and responsive to said second request, receiving a second response from the witness, wherein the second response indicates whether the second data storage system is the polarization winner or the polarization loser that is evicted from the cluster and rejects I/Os.

In at least one embodiment, the first data storage system can be the non-preferred data storage system, and the first processing can include the first data storage system not sending any TTL requests to the second data storage system, which is the non-preferred data storage system. The trigger condition can include failure to replicate writes of the stretched volume from the first data storage system to the second data storage system or expiration of the TTL granted to the first data storage system.

In at least one embodiment, processing can include, responsive to detecting an occurrence of the trigger condition, triggering second polarization processing for the second data storage system. The second polarization processing can include: determining that the second data storage system is not unhealthy; sending a second request to the witness requesting that the second data storage system be declared the polarization winner; and responsive to said second request, receiving a second response from the witness, wherein the second response indicates whether the second data storage system is the polarization winner or the polarization loser that is evicted from the cluster and rejects I/Os.

In at least one embodiment, determining the first data storage system is unhealthy can include determining that the first data storage system is experiencing an internal system failure that is one of a plurality of defined system failures including one or more of: a first defined system failure resulting in the first data storage system not able to service write requests and able to service read requests for existing data stored on the first data storage system; a second defined system failure resulting in the first data storage system not able to service read requests to read existing data stored on the first data storage system and able to service write requests; and a third defined system failure resulting in the first data storage system not being able to service any I/O operations.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
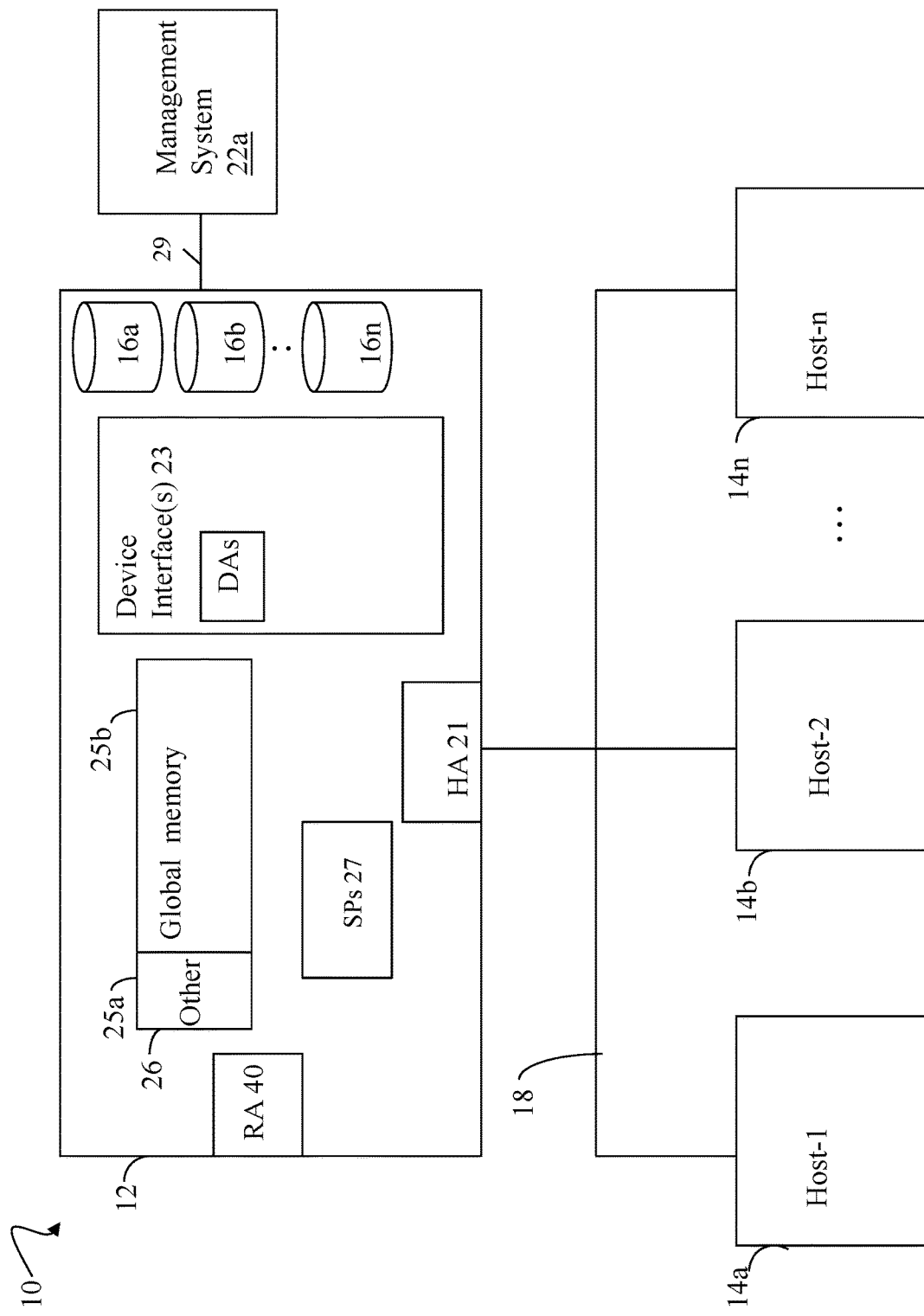
FIG. 1 is an example of components that can be included in a system in accordance with the techniques of the present disclosure.

Two data storage systems, such as "A" or "system A" and "B" or "system B", can be configured as a storage cluster. The two data storage system can present a single data storage object, such as a volume or logical device, to a client, such as a host. The volume data can be available to paths going to both data storage systems of the cluster, where writes to the volume on any one of the systems are automatically replicated to the other peer system. The two data storage systems of the cluster can be configured for two way synchronous replication for the volume, where the volume is configured as a stretched volume from a logical device or volume pair (V1, V2), where V1 is a first volume or logical device on system A and V2 is a second volume or logical device on the system B, and where V1 and V2 can be configured as the same volume or logical device having the same identity from the perspective of the host or other external client. The cluster configuration with the stretched volume configured for two way synchronous replicate can also be referred to herein as an active-active configuration.

The two systems A and B can maintain the cluster between them using any suitable technique, such as a time to live (TTL) mechanism. In such an embodiment using the TTL mechanism, one of the systems can be designated as preferred and can also be a leader system that grants a TTL to its peer that is designated as non-preferred and is a follower system. The non-preferred follower system lives as a cluster member at the mercy of the preferred leader system such that when the non-preferred follower system's TTL expires, it can go offline and may not be considered a current cluster member. In this case, the non-preferred follower system with an expired TTL rejects and does not service I/Os directed to the stretched volume. Additionally, the active-active bidirectional synchronous replication can be disabled so that writes to the stretched volume received at the preferred leader system are not replicated to the non-preferred follower system.

The active-active bidirectional synchronous replication can be disabled in response to one or more trigger conditions occurring. For example, once one of the systems cannot replicate a write for a stretched volume to its remote peer system, the active-active bidirectional synchronous replication can be disabled so that the two way synchronization for stretched volumes is disabled, one of the systems can be made unavailable, and I/O processing can continue on only a single surviving system. The foregoing is needed to avoid the possibility of having both systems each continue to service writes without replicating the writes to its peer since this can result in data corruption and data inconsistency with each system having its own copy of the volume data that is not synchronized with the other copy of the volume data on the peer system.

In some existing scenarios, protocols and algorithms used with the cluster can result in varying degrees of data unavailability for configured stretched volumes. For example, complete or partial data unavailability can occur as a result of using some existing techniques to select the single surviving system in response to an occurrence of a trigger condition such as a replication failure noted above. One existing technique provides for always selecting the system of the cluster designated as preferred as the single surviving system with the peer system made unavailable or evicted from the cluster (e.g., peer system does not service I/Os). However, consider a scenario where there is a complete failure of the preferred system and the non-preferred system remains fully functional. In this case using the foregoing existing technique, there is complete data unavailability since the always selected surviving system is unavailable and non-functional.

As a result, it may be desirable to improve upon existing protocols and algorithms used in connection with maintaining and managing the cluster. Described in the following paragraphs are techniques of the present disclosure that can be used to avoid or reduce data unavailability in certain scenarios.

In at least one embodiment, a first algorithm, algorithm A, sometimes referred to as one sided polarization, can be utilized in an active-active cluster configuration (also sometimes referred to herein as a metro cluster or metro cluster configuration). In at least one embodiment, the first algorithm considers the health of the systems of the cluster when determining whether to proactively perform polarization processing to select a single surviving system. In at least one embodiment, a system can be considered unhealthy if the system is experiencing an internal system error that, in some cases, can render the system capable of servicing some I/O but not all I/Os. In some cases, the system that is deemed unhealthy can still be capable of replicating writes to its remote peer and capable of functioning in its role in the cluster as either the preferred leader system or the non-preferred follower system. In at least one embodiment where a system is unhealthy and its remote peer system is not unhealthy but is rather functional and healthy (e.g., capable of servicing all I/Os), the first algorithm can provide for proactively performing polarization processing even though write data can be replicated between the systems. In at least one embodiment, the first algorithm can provide for disabling the unhealthy system and selecting the remote healthy peer as the single surviving system that services I/Os even in cases where the unhealthy system is the preferred leader system and the selected single surviving system is the non-preferred follower system. In at least one embodiment, the first algorithm can be used in a cluster that maintains cluster membership using the TTL mechanism that does not use a witness in connection with deciding a polarization winner. As a variation in at least one embodiment, the first algorithm can be used in a cluster that maintains cluster membership using the TTL mechanism that does use a witness in connection with deciding a polarization winner.

In at least one embodiment, a second algorithm, algorithm B, sometimes referred to as an improved polarization algorithm with a witness, can be utilized in an active-active cluster configuration. The second algorithm can be performed to select a single surviving system to service I/Os as part of polarization processing where such selection uses an additional system or component functioning as a witness. In connection with the second algorithm, the first one of the systems that requests the witness for its vote can be selected as the single surviving system. In at least one embodiment of the second algorithm, one or more intentional time delays can be introduced prior to a system contacting the witness for its vote. A first intention time delay can be introduced for a system that is designed as non-preferred in order to provide the preferred system a time advantage in securing the witness vote. A second additional time delay can be introduced for a system that is deemed unhealthy in order to provide the system's remote peer a time advantage in securing the witness vote. In at least one embodiment, the second algorithm can be used with a cluster that maintains cluster membership using the TTL mechanism that does use a witness in connection with deciding a polarization winner.

In at least one embodiment, a third algorithm C that can be performed by a control component or system with control software executing thereon. The control software can perform processing described herein to detect an unhealthy system and then, responsive to detecting an unhealthy system, disabling the active-active bidirectional synchronous replication so that the unhealthy system is disabled or taken offline and its peer remains as the single surviving system that services I/Os. In at least one embodiment, the third algorithm can be used in a cluster that maintains cluster membership using the TTL mechanism and that further does not use a witness in connection with deciding a polarization winner. As a variation in at least one embodiment, the third algorithm can be used in a cluster that maintains cluster membership using the TTL mechanism that does use a witness in connection with deciding a polarization winner.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* that can be used to manage and monitor the data storage system 12. In one embodiment, the management system 22*a* can be a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22*a* to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22*a* to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
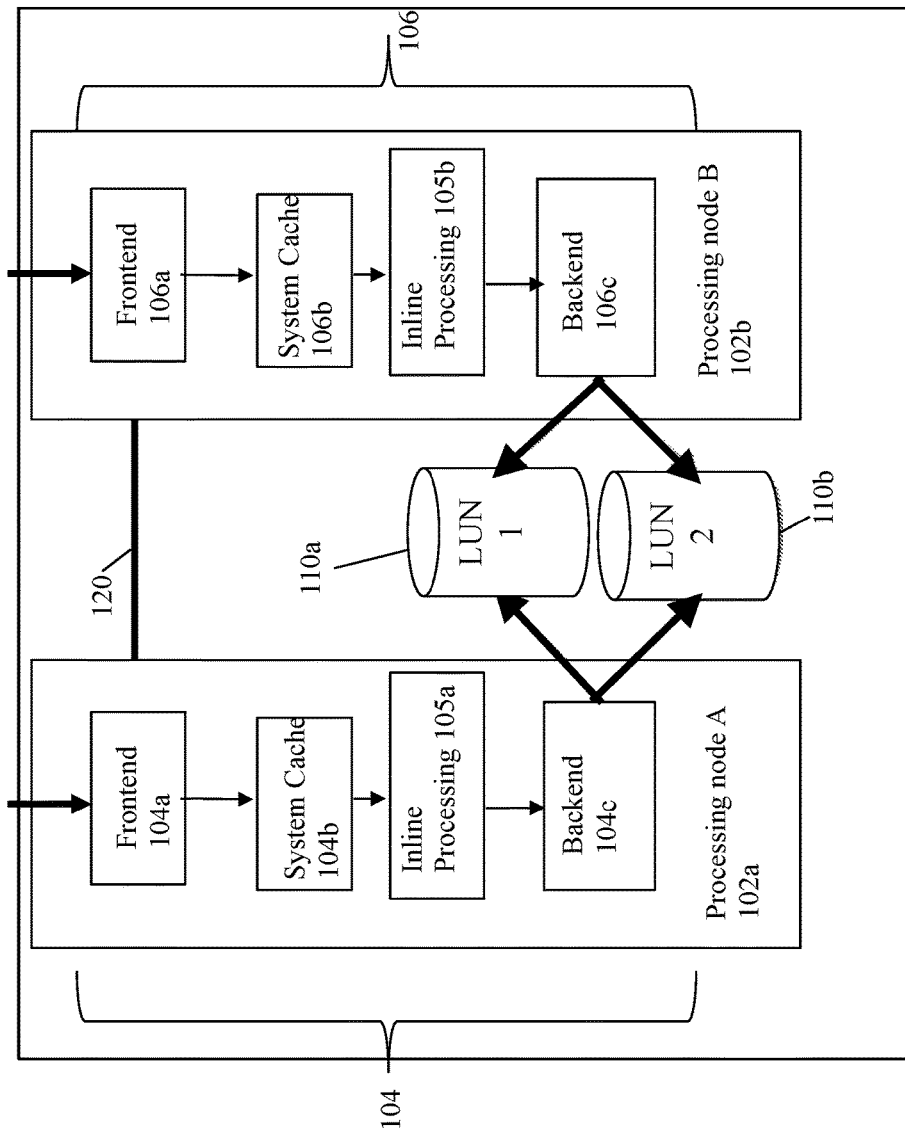
FIG. 2 is an example illustrating the PO path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a synchronous mode described elsewhere herein.

Figure 3:
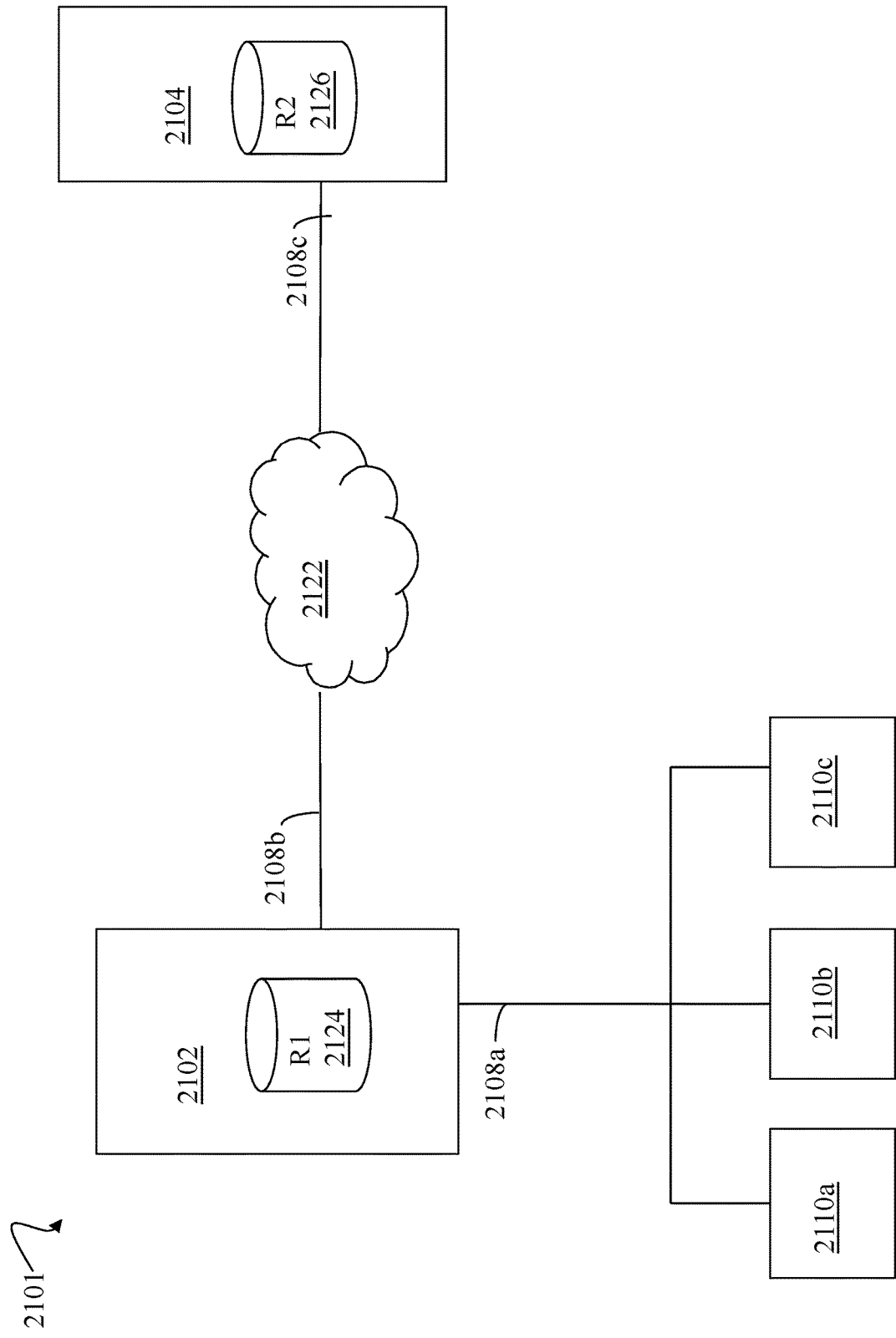
FIG. 3 is an example of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can issue I/Os and other operations, commands, or requests to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 104 can be characterized as remote with respect to the hosts 2110a, 2110b and 2110c. The R1 and R2 devices can be configured as LUNs.

The host 1210a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

A RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

With synchronous mode remote data replication, a host 2110a can issue a write to the R1 device 2124. The primary or R1 data storage system 2102 can store the write data in its cache at a cache location and mark the cache location as including write pending (WP) data as mentioned elsewhere herein. The RRF operating in the synchronous mode can propagate the write data across an established connection or link (more generally referred to as a the remote replication link or link) such as over 2108b, 2122, and 2108c, to the secondary or R2 data storage system 2104 where the write data is stored in the cache of the system 2104 at a cache location that is marked as WP. Once the write data is stored in the cache of the system 2104 as described, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. Thus, generally, R1 device 2124 and R2 device 2126 can be logical devices, such as LUNs, configured as mirrors of one another. R1 and R2 devices can be, for example, fully provisioned LUNs, such as thick LUNs, or can be LUNs that are thin or virtually provisioned logical devices.

Figure 4:
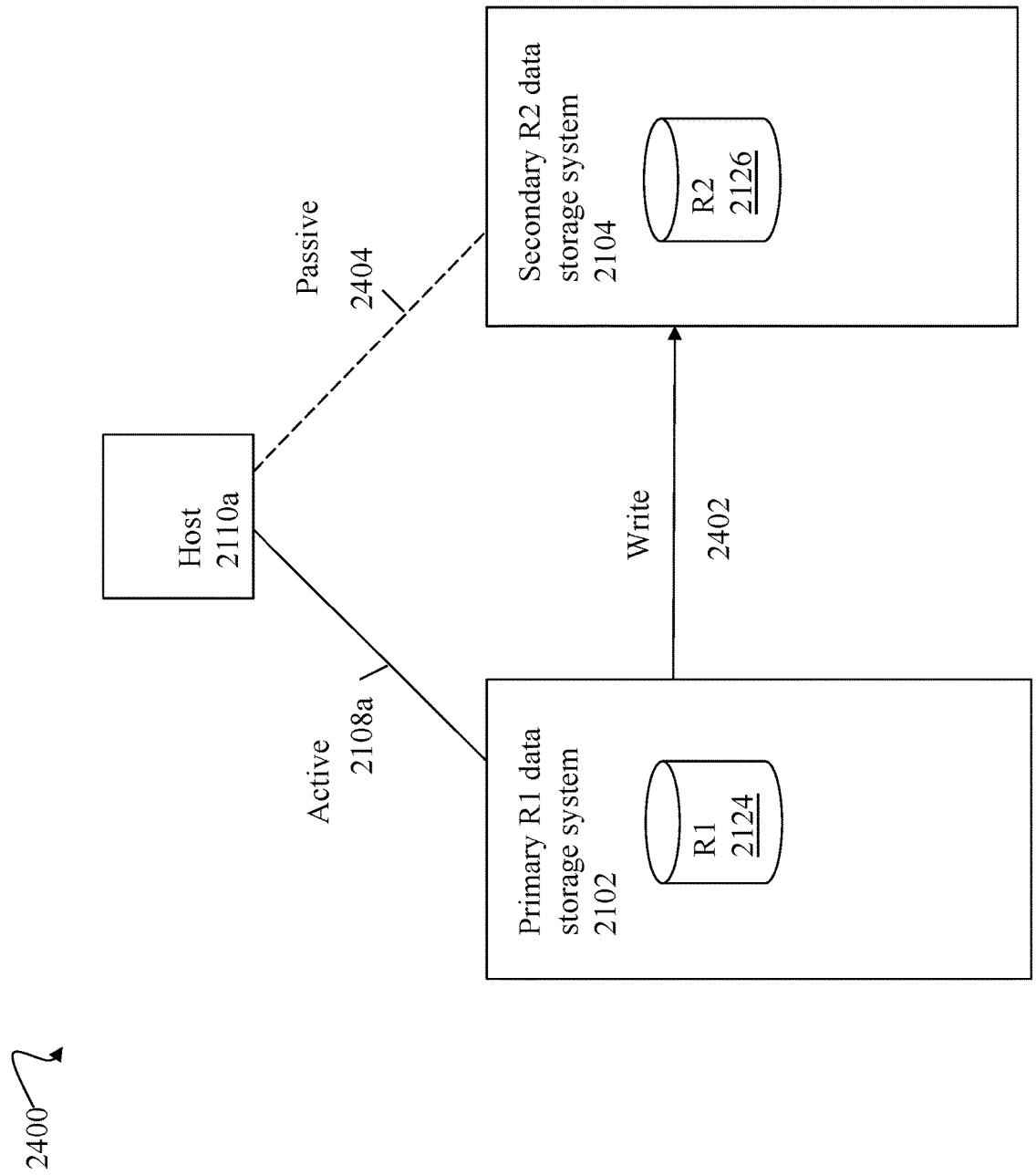
FIG. 4 is an example illustrating an active-passive replication arrangement.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration such as with synchronous replication and other supported replication modes where the host 2110a has an active connection or path 2108a over which all I/Os are issued to only the R1 data storage system. The host 2110a can have a passive connection or path 2404 to the R2 data storage system 2104.

In the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued). For example, the devices 2124 and 2126 can be configured to have the same logical device identifier such as the same world wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links can be used in connection with replicating data from systems 2102 to system 2104.

Figure 5:
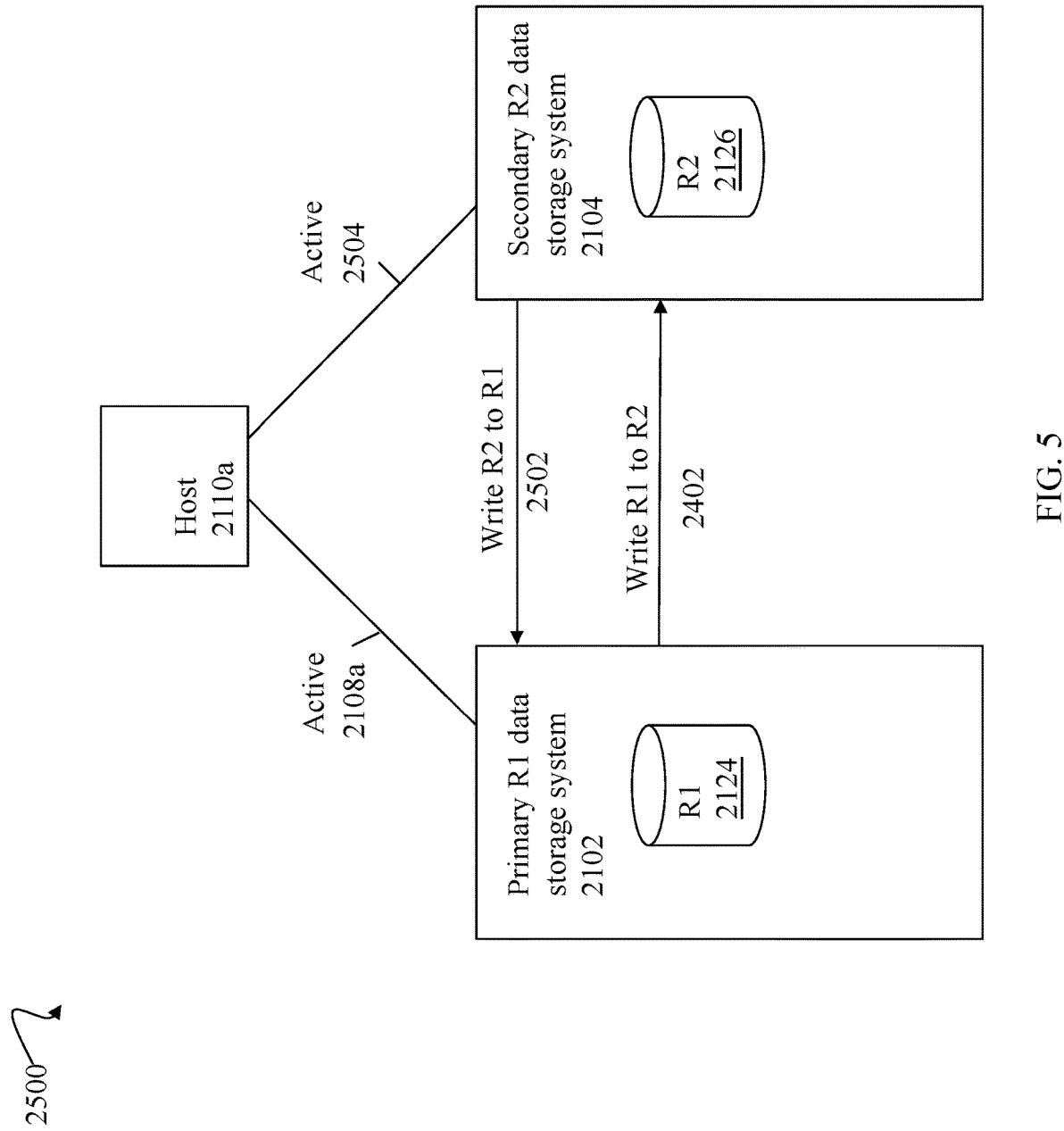
FIG. 5 is an example illustrating an active-active arrangement for a stretched volume without a witness.

Referring to FIG. 5, shown is an example configuration of components that can be used in an embodiment. The example 2500 illustrates an active-active configuration as can be used in connection with synchronous replication in at least one embodiment. In the active-active configuration with synchronous replication, the host 2110a can have a first active path 2108a to the R1 data storage system and R1 device 2124 configured as LUN A. Additionally, the host 2110a can have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration can issue I/Os, both reads and/or writes, over both of the paths 2108a and 2504 at the same time. The host 2110a can send a first write over the path 2108a which is received by the R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The host 2110a can also send a second write over the path 2504 which is received by the R2 system 2104 and written to the cache of the R2 system 2104 where, at a later point in time, the second write is destaged from the cache of the R2 system 2104 to physical storage provisioned for the R2 device 2126 configured as the LUN A. The R2 system 2104 also sends the second write to the R1 system 2102 over a second link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the R1 system 2102, the R1 system 2102 sends an acknowledgement over the link 2502 to the R2 system 2104 that it has completed the second write. Once the R2 system 2104 receives the acknowledgement from the R1 system (regarding completion of the second write), the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110a unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that although FIG. 5 illustrates for simplicity a single host accessing both the R1 device 2124 and R2 device 2126, any number of hosts can access one or both of the R1 device 2124 and the R2 device 2126.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host 2110a by having each volume or device of the device pair (R1 device 2124, R2 device 2126) configured and presented to the host 2110a as the same volume or LUN A. Additionally, the stretched LUN A is configured for two way synchronous remote replication between the systems 2102 and 2104 respectively including the two devices or volumes of the device pair, (R1 device 2124, R2 device 2126).

In a metro cluster configuration, hosts can be configured with uniform host connectivity as illustrated in FIGS. 4 and 5, where the host 2110a can be connected to both data storage systems 2102 and 2104 exposing the pair of devices or volumes 2124, 2126 configured as the same stretched volume or LUN, such as the LUN A described in connection with FIG. 5. From the perspective of the host 2110a of FIG. 5 in at least one embodiment, the data storage system 2102 can be a local data storage system included in the same data center as the host 2110a, and the data storage system 2104 can be a remote data storage system. Thus the host 2110a is configured with uniform host connectivity. In contrast to uniform host connectivity is non-uniform host connectivity, for example, where the host is only connected to the local data storage system but not the remote data storage system of the metro cluster configuration.

It should be noted that FIG. 5, illustrates a configuration with only a single host connected to both systems 2102, 2104 of the metro cluster. More generally, a configuration such as illustrated in FIG. 5 can include multiple hosts where one or more of the hosts are connected to both systems 2102, 2104 and/or one or more of the hosts are connected to only a single of the systems 2102, 2104.

In at least one embodiment of a metro cluster configuration including two data storage systems such as described elsewhere herein, for example, such as in FIG. 5, different techniques can be used to maintain and manage the metro cluster configuration. For example, in at least one embodiment, a Time to Live (TTL) mechanism can be used to maintain and manage the metro cluster configuration and relationship between the two data storage systems. Using the TTL mechanism, one data storage system can be designated as the leader system and the other peer data storage system can be designated as the follower system. Using the TTL mechanism, the leader system can provide a TTL grant to the follower system granting or providing the follower system with a license or membership in the metro cluster configuration for servicing I/Os directed to a stretched LUN configured on the two data storage systems of the metro cluster. Additionally, the TTL grant can be used to provide an amount of time for the license or cluster membership to the follower system after which the license or cluster membership can be deemed expired. Using the TTL mechanism, the leader can also effectively revoke the TTL grant to the follower even in the presence of link failures or other communication issues that prevent the leader from communicating with the follower. For example, the leader can effectively revoke the TTL grant to the follower by allowing the TTL grant to expire. Generally, the TTL mechanism can be used in connection with multiple data storage systems of a metro-cluster configuration to maintain and manage the metro cluster configuration. Using the TTL mechanism, the follower system can have membership in the metro cluster and perform synchronous replication and other actions as an active member of the metro cluster when the follower system has an unexpired TTL grant. When a TTL grant of a system has expired, the system is considered evicted from the metro cluster, and does not service I/Os such as those directed to the stretched LUNs of the metro cluster. The TTL mechanism is an example of one technique that can be used to maintain a metro cluster configuration. More generally, any suitable technique can be used to maintain the metro cluster configuration of the systems 2102, 2104 of FIG. 5.

In at least one embodiment of FIG. 5 using the TTL mechanism discussed above, the follower system can periodically request, such at regular intervals prior to its current TTL grant expiring, a new updated TTL providing the follower system a revised expiration time of the TTL grant. Each of the leader and follower systems can maintain a TTL expiration time that is periodically refreshed and used in conjunction with a system time of day (TOD) to monitor for expiration of the TTL. Whenever the TOD value is higher than the expiration time on a system, it means the TTL has expired and the system can initiate polarization (e.g., described in more detail below). Periodically, the TTL expiration time is updated as a result of TTL requests from the follower system to the leader system. In response to a request, the leader system can extend the TTL expiration time ahead a fixed or predetermined amount of time so that the TTL expiration time denotes a future point in time. If TTL updates stop, such as due to the follower system not sending any TTL requests for renewing the TTL expiration time, eventually the TOD clock surpasses the TTL expiration time and polarization can be triggered. The leader system can use the TTL expiration time to track its projection of when the TTL timer of the follower system expires. When a system's TTL timer expires such that the TOD value is greater than the TTL timer, polarization can be triggered. In connection with discussion herein, the foregoing TTL mechanism where the follower system lives or is a cluster member at the mercy of the leader system can be characterized as using a unidirectional TTL request-grant.

In a metro cluster with two systems such as illustrated in FIG. 5, when communication between the two systems fails so that data can no longer be replicated between the two systems, polarization can be triggered in order to reduce the two active/active systems of the metro cluster configuration to a single surviving system that keeps servicing data requests. In a metro configuration with two systems, polarization includes a technique for selecting a single survivor system to handle or service I/Os. The communication failure between the two systems, X and Y, of the metro cluster can be determined, for example, by the system X where the system X is unable to replicate a write to the system Y due to detected failed replication link(s) or connections. As another example, the communication failure can be determined by the system X where the system Y is non-responsive to replication communications sent over a replication link from the system X to the system Y. In the foregoing examples, the system X can determine the communication failure with the system Y resulting in replication failure, and, in response, the system X can then trigger polarization processing. As yet another example in a metro cluster configuration that uses the TTL mechanism described herein to maintain the cluster membership using the unidirectional TTL request-grant, the communication failure can be determined by a follower system if the follower system has issued a request to the leader system to renew the follower system's TTL expiration and the leader system has not responded thereby causing the leader system's TTL to expire. As yet another example in a metro cluster configuration that uses the TTL mechanism described herein to maintain the cluster membership, the communication failure can be determined by a leader system if the projected follower system's current TTL (as tracked by the leader system) has expired (since the leader system has not received a request to renew the follower system's TTL. In this latter case, the leader system can trigger polarization responsive to expiration of the projected follower system's TTL (as tracked by the leader system).

Generally, in at least one embodiment, polarization can be triggered to evict a system X from the metro cluster responsive to determining an occurrence of one or more trigger conditions, some of which are noted above. The trigger condition can be a determination that writes cannot be replicated to the system X. The trigger condition can be that the system X is non-responsive to communications sent by another system Y that is a metro cluster member. More generally, an embodiment can define trigger conditions to include the foregoing alone, or in combination with, other suitable trigger conditions such that if any one of the defined trigger conditions occurs, polarization can be triggered.

Different techniques can be used to select a winner of polarization, where the winner is the designated single data storage system of the metro cluster configuration that is selected to service all I/Os as the single active data storage system of metro cluster. The remaining peer data storage system of the metro configuration can sometimes be referred to as the loser of polarization which does not service any I/Os of the metro cluster. It should be noted that a single winner system is selected in connection with polarization to subsequently service all I/O of the metro cluster in order to avoid the possibility of data inconsistency which can occur, for example, if both systems service writes to the same target logical address of the stretched LUN, such as LUN A of FIG. 5, but the data written by such writes cannot be replicated between the systems of the metro cluster.

One technique for selecting the winner of polarization includes using a predetermined or predesignated one of the data storage systems of the metro cluster configuration. In this case, one of the data storage systems of the metro cluster configuration is generally selected beforehand prior to the event triggering polarization. The predetermined or preselected data storage system of the metro cluster can have an associated attribute or role of "preferred" and can also be referred to herein as the preferred system or preferred data storage system in connection with polarization. The remaining data storage system of the metro cluster can have an associated attribute or role of "non-preferred" and can also be referred to herein as the non-preferred system or non-preferred data storage system in connection with polarization. In at least one embodiment using the TTL mechanism and polarization, the preferred data storage system can be the leader system and the non-preferred data storage system can be the follower system.

In one existing implementation of a metro cluster configuration, the preferred data storage system can always be selected as the winner of polarization, where the winner is the single data storage system selected to service I/Os of the metro cluster configuration, and where the loser is the remaining non-preferred data storage system that does not service I/Os of the metro cluster configuration. In such a configuration, the preferred data storage system can be the predetermined or preselected system of the metro cluster configuration selected as the designated survivor that services I/Os of the metro cluster as a result of polarization when the data storage systems of the metro cluster configuration cannot communicate with one another. In a metro cluster configuration of two data storage systems such as in FIG. 5, a first of the two systems can be designated as the preferred system and the second remaining system can be designated as the non-preferred system. Thus, with polarization in such an arrangement of a metro cluster configuration as in FIG. 5 with 2 data storage systems, the preferred system in at least one existing implementation can always be the winner of polarization selected to service I/Os of the metro cluster, and the non-preferred system can always be the loser that does not service any I/Os of the metro cluster.

As another existing technique, the winner of polarization can be selected using an additional system, such as an additional data storage system or other system, referred to as a witness.

Figure 6:
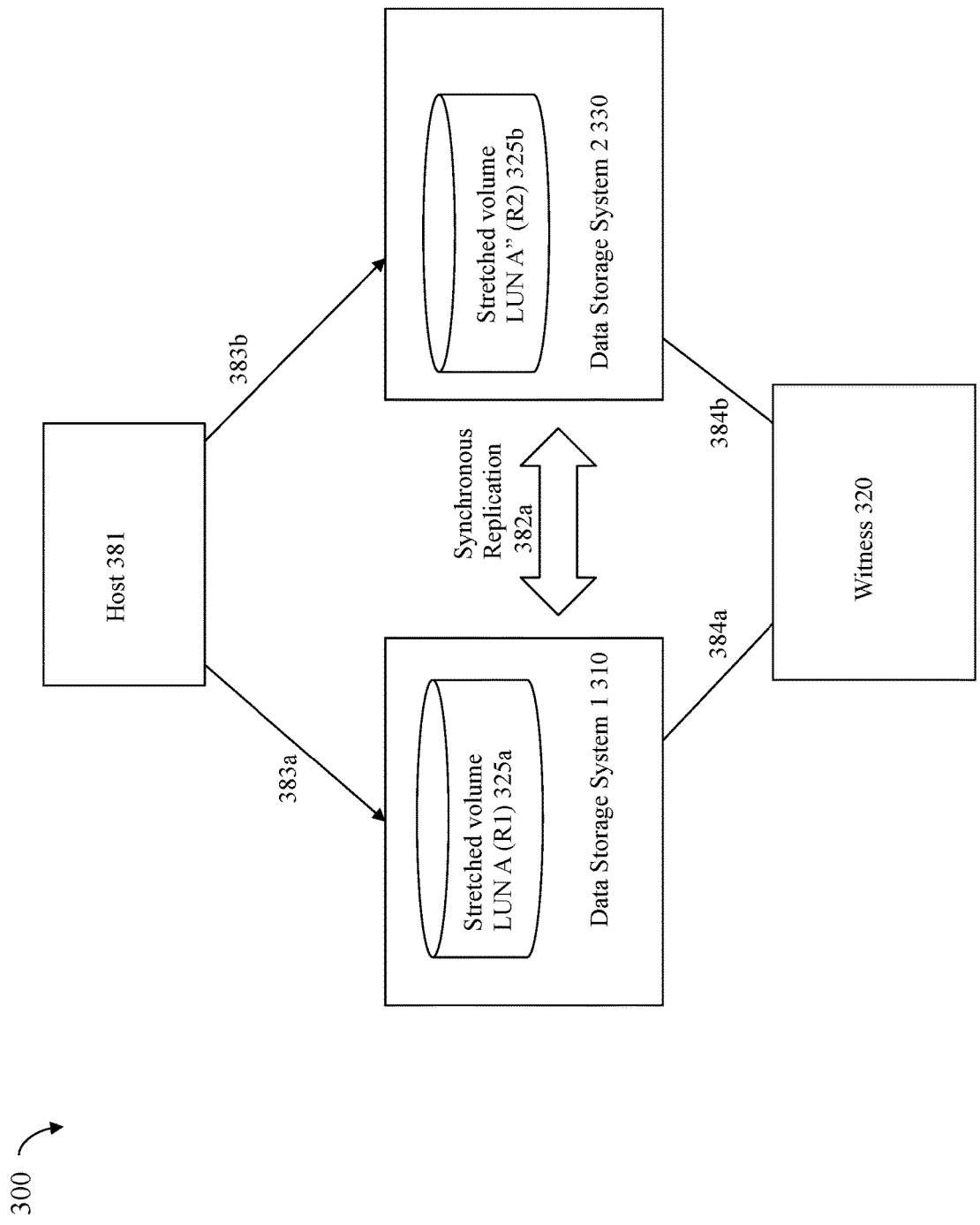
FIG. 6 is an example illustrating an active-active arrangement for a stretched volume with a witness.

Referring to FIG. 6, shown is an example of a metro cluster configuration using a witness. The example 300 includes a host 381, data storage systems 310, 330 and a witness 320. The witness 320 can be an additional third data storage system. The stretched volume A is configured from a first volume R1 LUN A 325*a* on the system 310 and a second volume R2 LUN A" 325*b* on the system 330, where the volumes 325*a-b* are configured to have the same identity, "LUN A", as presented to one or more hosts such as the host 381. As discussed above such as in connection with FIG. 5, the volumes 325*a-b* can be configured for two way synchronous remote replication over one or more replication links 382*a* in order to synchronize the content of the volumes 325*a-b* to be mirrors of one another. In this example in a manner similar to that as discussed in connection with FIG. 5, the host 381 can issue I/Os to the LUN A configured as the volume 325*a* over the path 383*a*, where any write I/Os are then synchronously replicated (382*a*) from the system 310 to the system 330, and then written to the volume 325*b*. The host 381 can issue I/Os to the LUN A configured as the volume 325*b* over the path 383*b*, where any write I/Os are then synchronously replicated from the system 330 to the system 310, and then written to the volume 325*a*.

Additionally, the systems 310 and 330 of metro cluster configuration are also connected to the witness 320, respectively, over the connections 384*a*, 384*b*. In at least one embodiment, the system 310 can communicate with the witness 320 over the connection 384*a* as part of polarization processing discussed below; and the system 330 can communicate with the witness 320 over the connection 384*b* as part of polarization processing discussed below.

In embodiments of polarization using a witness as illustrated in FIG. 6, one of the systems can be designated as the preferred system and the remaining peer system can be designated as the non-preferred system as discussed above. In embodiments of polarization using a witness as illustrated in FIG. 6, when there is a communication failure resulting in replication failure between the systems 310, 330 of the metro cluster triggering polarization, the preferred system is not automatically determined as the winner. Rather the first data storage system of the metro cluster configuration that is able to obtain the witness's vote survives as the winner of polarization.

In embodiments with a witness, the preferred data storage system can have an advantage or a preference in the voting process over the non-referred data storage system by allowing the preferred data storage system the opportunity to contact the witness and obtain the witness's vote prior to the non-preferred data storage system. For example, processing performed in connection with polarization can include having the non-preferred system wait a specified amount of time prior to contacting the witness to obtain the witness's vote. Thus, there is an intentional time delay introduced prior to the non-preferred data storage system contacting the witness and requesting the witness's vote as the winner of polarization. In contrast, there is no intentional time delay introduced for the preferred data storage system, where the preferred data storage system does not wait an amount of time prior to contacting the witness to obtain the witness's vote as the winner of polarization. In this manner, the preferred data storage system (if on-line and functional) is given a time advantage to contact the witness prior to the non-preferred data storage system in efforts to request and obtain the witness's vote as the winner of polarization. In the event that both the preferred data storage system and the non-preferred data storage system are online and functional and able to communicate with the witness but unable to communicate with each other and/or unable to replicate data therebetween, the intentional time delay which the non-preferred data storage system waits prior to contacting the witness allows the preferred data storage system a time advantage to contact and request the witness's vote as the winner of polarization first prior to the non-preferred data storage system. In the event that the preferred data storage system is offline and/or non-functional and is therefore unable to communicate with the witness, then the non-preferred data storage system contacts and obtains the witness's vote as the winner of polarization.

Inter-data storage system communication failure between the data storage systems of the metro cluster that triggers polarization can occur for any one or more reasons. For example, one of the systems can be capable of servicing I/Os but can have a network or communication failure of all replication links such that the system is unable to replicate writes to its peer system of the metro cluster. As another example, a system of the metro cluster can be offline due to the system crashing and rendering the system completely non-functional or inoperable. In this latter case, the inter-data storage system communication failure that results in the inability to replicate data between the two systems of the metro cluster configuration and that triggers polarization can be characterized as due to an internal system failure rendering the system completely non-functional or inoperable.

In arrangements not using a witness such as in connection with FIG. 5, one drawback of existing techniques of always selecting the preferred system as the winner of polarization occurs when the preferred system crashes or otherwise experiences a system failure causing the system to be offline and completely unavailable. In this case, the selected winner of polarization can have a non-functional state rendering the winner system completely unable to service I/Os thereby leading to complete data unavailability to hosts or other data storage clients of the metro cluster. As discussed below in more detail, in some instances when polarization is triggered, the preferred system can have an internal failure where the preferred system with the internal failure can be selected as the winner of polarization. In some instances of internal failure, the preferred system can still communicate with hosts and receive I/Os yet have an unhealthy or degraded state that is capable of servicing some I/Os but not all I/Os. In this latter case, the winner still cannot fully service all I/Os of the metro cluster even though the peer system may be completely healthy and capable of servicing all I/Os. Additionally, the health of the winner system can still further degrade to a point where it may not be able to service any I/Os thereby resulting in complete data unavailability.

In existing implementations using a witness as illustrated in FIG. 6, the selected winner of polarization can again be a system as described above that has an unhealthy or degraded state with an internal failure and can also still be able to communicate with the witness to be selected as the winner of polarization. In this case, the winner of polarization can have an internal failure resulting in an unhealthy or degraded state where the winner system is capable of servicing some I/Os but not all I/Os. In this latter case, the winner still cannot fully service all I/Os of the metro cluster. Additionally, the health of the winner system can still further degrade to a point where it may not be able to service any I/Os thereby resulting in complete data unavailability.

In such instances where one system of the metro cluster is unhealthy with an internal failure and the other peer system is healthy, if polarization is triggered, it can be desirable and beneficial to ensure that the other healthy peer system (even if not the designated preferred system) is the selected polarization winner in order to reduce or avoid data unavailability. Additionally, it can be beneficial under certain conditions to proactively trigger polarization and let the healthy or healthier peer system be the winner that is the sole system servicing I/Os of the metro cluster configuration in order to reduce or avoid data unavailability.

Accordingly, described in the following paragraphs are techniques of the present disclosure that can be used to reduce or avoid data unavailability. The techniques use enhanced protocols with embodiments of a metro cluster configuration to reduce or avoid data unavailability in particular scenarios such as due to an internal failure in a data storage system even though the system can still be capable of replicating writes, receiving I/Os from hosts and communicating with its remote peer system. In at least one embodiment, the techniques of the present disclosure described in the following paragraphs can be performed in a metro cluster configuration without a witness such as described above, for example, in connection with FIG. 5. For example, consistent with discussion herein, the algorithms A and C (e.g., also sometimes referred to as the first and third algorithms, respectively) can be performed in a metro cluster configuration that does not use a witness to decide the polarization winner. In at least one embodiment, at least some of the techniques of the present disclosure described in the following paragraphs can also be performed in a metro cluster configuration with a witness such as described above, for example, in connection with FIG. 6. For example, consistent with other discussion herein, the algorithms A, B and C (e.g., sometimes referred to as the first, second and third algorithms, respectively) can be performed in a metro cluster configuration that does use a witness to decide the polarization winner.

As noted above, polarization can be triggered in a metro cluster configuration as a result of one system detecting a data replication failure where the system is unable to replicate data to its peer system. The data replication failure can occur, for example, due to failure of the replication links and where both systems of the cluster can also be online and able to communicate with a witness (if any) and receiving I/Os from one or more connected hosts. As a variation, the data replication failure can be due to a complete system failure of one of the systems, where the complete system failure renders the system unavailable (e.g., completely inoperable and offline).

In at least one embodiment, there can be different types of internal system failures within a data storage system resulting in the system providing varying degrees of I/O servicing capabilities. Additionally, the data storage system can have a type of internal system failure that leaves the system in an unhealthy or degraded state but does not render the system completely unavailable or offline. However, the system with the internal system failure can still be able to, for example, communicate with a witness, receive I/Os from hosts, communicate with its peer system, and/or service some I/Os. Thus, the system with the internal system failure can be characterized in one aspect as having an unhealthy or degraded state with incomplete functionality but where the internal system failure does not render the system completely offline or unavailable.

For example, in at least one embodiment, the following types of internal system failures can occur internally for a data storage system of the metro cluster configuration:

a) Out of disk space. The system cannot service new writes since the system has no free or available non-volatile storage for storing new data.

b) Out of cache storage. The system cannot service new writes since the new write data cannot be cached.

c) Out of journal or log space. The system cannot service new writes since writes cannot be recorded in the log. This error can occur in a log-based system that records writes in a log file and then subsequently destages or flushes the recorded writes from the log to the backend PDs (e.g., non-volatile backend storage).

d) Double disk failure in a RAID-5 disk layout of back end non-volatile storage. In this case, the system can service new writes and write the new data to healthy backend PDs. However, the system has existing data stored on the failed backend PDs that cannot be read or recovered.

e) Meta data corruption. With this type of failure, the data stored on the backend PDs can be fine. However, the meta data used to access the stored data is corrupted and cannot be used to retrieve currently stored data on the backend PDs. In such a system, the meta data can be used, for example, to map a logical address to its corresponding physical address or location on the backend PDs.

f) Internal network failure. With this type of failure, the system cannot access the backend PDs containing the stored data and metadata.

g) Double node failure. With this type of failure within a dual node system such as illustrated in FIG. 2, no processor is available for executing any I/O.

The foregoing are some non-limiting examples of internal system failures that can occur within a data storage system providing varying degrees of data unavailability, data loss and/or inability to service I/Os. For example, for the system failure types a, b and c noted above, data cannot be written and thus the data storage system having a system failure of type a, b or c cannot service write I/Os but can still service reads that read existing data stored on the system. For the system failure types d and e noted above, write I/Os can be serviced but the system cannot service read I/Os for existing data. Thus, in connection with failure types d and e, there can be a permanent data loss with respect to the existing data. For system failure types f and g noted above, the data storage system cannot service any I/Os (e.g., cannot service read or write operations).

In connection with a system experiencing an internal system failure such as one or more of the above-noted types a-g, the system can still be online in communication with the host(s), can still receive I/Os from the host(s), can still communicate with a witness (if any), and/or can still replicate received write I/O data to its peer system as part of the synchronous replication of a stretched LUN (e.g., such as the LUN A discussed above) in the metro cluster configuration.

In connection with a system experiencing an internal system failure such as one or more of the above-noted types a-g, data replication between the systems of the metro cluster configuration can fail and be detected. Additionally, even though data replication has failed such as due to all replication links being down, the system with the internal system failure can still function in many aspects. For example, the system with the internal system error can still be online in communication with the host(s), can still receive I/Os from the host(s), and/or can still communicate with a witness (if any).

In connection with discussion in the following paragraphs, embodiments of a metro cluster configuration can use the TTL mechanism with the unidirectional TTL grant-request having a leader system that grants TTL requests, and a follower system that sends the TTL requests to the leader system, where the leader system is the preferred system and the follower system is the non-preferred system. In such embodiments using the unidirectional TTL grant-request TTL mechanism to maintain the metro cluster, a polarization winner can be decided in configurations that may or may not include a witness. Polarization can be triggered by the follower non-preferred system when the follower system's TTL grant expires due to the follower system not receiving a subsequent TTL renewal from the leader and preferred system in response to the follower system's request to renew its TTL. In cases where a witness is used to determine the polarization winner, the follower system (e.g., due to its non-preferred status) can wait an additional amount of time since its last ungranted TTL request was sent to the leader system (e.g., having the preferred status) before the follower system contacts the witness to both provide the preferred system with a time advantage in obtaining the witness vote and also to ensure that the preferred leader system, if operable, has triggered and commenced its own polarization processing. In at least one embodiment when the non-preferred follower system's TTL grant has expired due to failure to receive a TTL renewal grant response from the preferred leader system, the non-preferred follower system can 1) wait a specified amount of time of time prior to commencing its polarization processing to ensure that the preferred leader system has also commenced its polarization processing; and then 2) as part of its polarization processing, wait an additional amount of time prior to contacting the witness to provide the preferred leader system a time advantage in obtain the witness vote.

Before proceeding to discuss the techniques of the present disclosure, provided is a further discussion to more fully illustrate problems that can occur in connection with occurrences of different types of internal system failures such as, for example, the types a-g described above.

Consider a scenario where there are two data storage systems, A and B, in a metro cluster configuration without a witness, such as illustrated in FIG. 5. Assume the system A is designated as the preferred system and system B is the non-preferred system. The metro cluster configuration can use the TTL mechanism discussed above where the system A is the leader system that grants a TTL or time-based lease on cluster membership to the system B, the follower system. The system A has a system failure, such as one of the types a-e noted above, where the system A can service some I/Os but cannot service others. In this case, the system A rejects with a return error the I/Os it cannot service. Assume a write is received by the remote peer system B that cannot be replicated to the system A resulting in the system B triggering polarization, and evicting the non-preferred node B from the metro cluster. As a result, the winner of polarization in this example is the unhealthy system A with the system failure and there is some degree of data unavailability since system A cannot service all I/Os. It should be noted that in response to B triggering polarization, the system B may be still be able to communicate with the system A to notify A regarding polarization triggered and thus that A is the winner. If the system B is unable to communicate with the system A but the system A receives I/Os from connected hosts for processing, the system B's TTL will eventually expire whereby B identifies itself as evicted (e.g., no longer a member of the metro cluster), B does not service subsequently received I/Os, and A can continue as the single system that services received I/Os of the metro cluster configuration. Additionally, the system A as the leader system notes the expiration of B's TTL whereby A identifies that B is evicted from the metro cluster. In this manner, the system A can identify itself as the single system of the metro cluster servicing I/Os.

Now consider a scenario where there are two data storage systems, A and B, in a metro cluster configuration with a witness, such as illustrated in FIG. 6. Assume, as above, the system A is designated as the preferred system, and system B is the non-preferred system. The metro cluster configuration can use the TTL mechanism discussed above where the system A is the leader system that grants a TTL or time-based lease on cluster membership to the system B, the follower system. The system A has a system failure, such as one of the types a-e noted above, where the system A can service some I/Os but cannot service others. In this case, the system A rejects the I/Os it cannot service with a return error. Assume a write is received by the remote peer system B that cannot be replicated to the system A resulting in the system B triggering polarization. In this scenario, assume that both systems A and B can communicate with the witness and each other. The system B notifies the system A regarding the polarization and both systems A and B contact the witness to request the witness's vote as the winner. As noted above, the system A has a time advantage in sending its request so assume the system A obtains the witness's vote and is the winner. Subsequently, the request from the system B to the witness does not result in B obtaining the witness's vote and rather the witness rejects B's request as the winner. As a result, the system B is the loser and evicted from the metro cluster. As a result, the winner of polarization in this example is the unhealthy system A with the system failure and there is some degree of data unavailability since system A cannot service all I/Os.

The foregoing are examples of scenarios of data unavailability that the techniques of the present disclosure discussed herein can avoid. In some instances where all replication links between the two data storage systems of the metro cluster are down, and where there is a system failure (e.g., one of the internal system failures a-g noted above) on one of the data storage systems, communication between the two data storage systems can still be performed such as to perform processing of the techniques of the present disclosure. For example, in at least one embodiment, control components located internally within the data storage systems and/or located externally outside the data storage systems can facilitate inter-data storage system communication to perform processing of the techniques of the present disclosure.

In at least one embodiment in a metro cluster configuration such as illustrated in FIG. 5 without a witness, the first algorithm, algorithm A, sometimes referred to as one sided polarization, can be utilized. In such an embodiment, each of the two data storage systems, A and B, can independently and internally perform processing of the first algorithm of the present disclosure that will now be described with reference to FIGS. 7A and 7B. In at least one embodiment, the one sided polarization processing or algorithm as described below in connection with FIGS. 7A and 7B can be performed in a metro cluster configuration as illustrated in FIG. 5 which does not use a witness for selecting a polarization winner. In such an arrangement of FIG. 5 without a witness as discussed above, the preferred system can be selected as the polarization winner when performing polarization. In at least one embodiment, the one sided polarization processing or algorithm as described below in connection with FIGS. 7A and 7B can be performed in a metro cluster configuration as illustrated in FIG. 6 which does use a witness for selecting a polarization winner. In such an arrangement of FIG. 6 with a witness as discussed above, the polarization winner can be determined as the first of the two systems that contacts the witness to obtain the witness vote as the polarization winner.

Figure 7A:
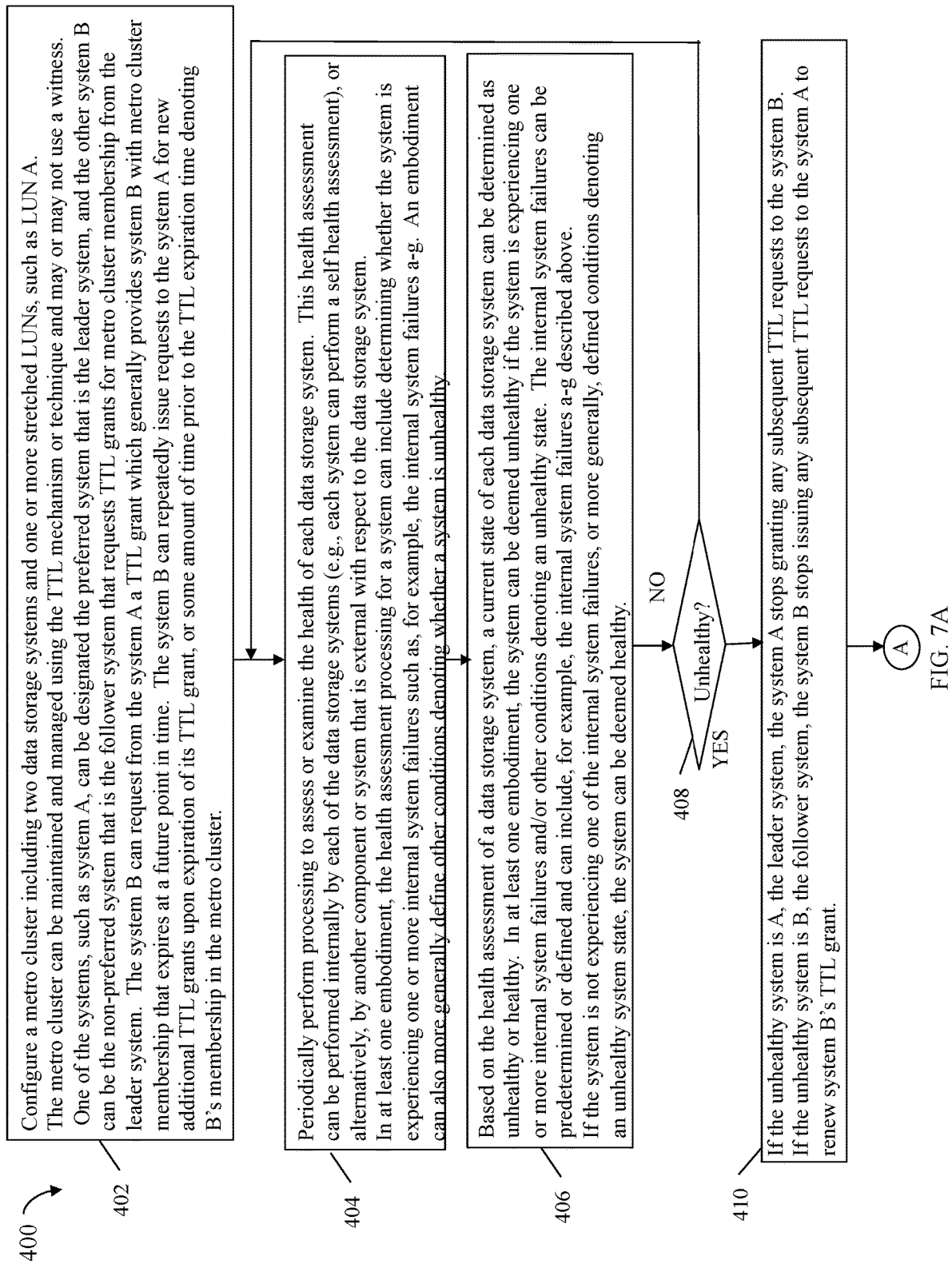
FIGS. 7A, 7B, 8A, 8B, 8C, 8D 8E and 9 are flowcharts of processing steps that can be performed in an embodiment in accordance with the techniques of the present disclosure.
Figure 7B:
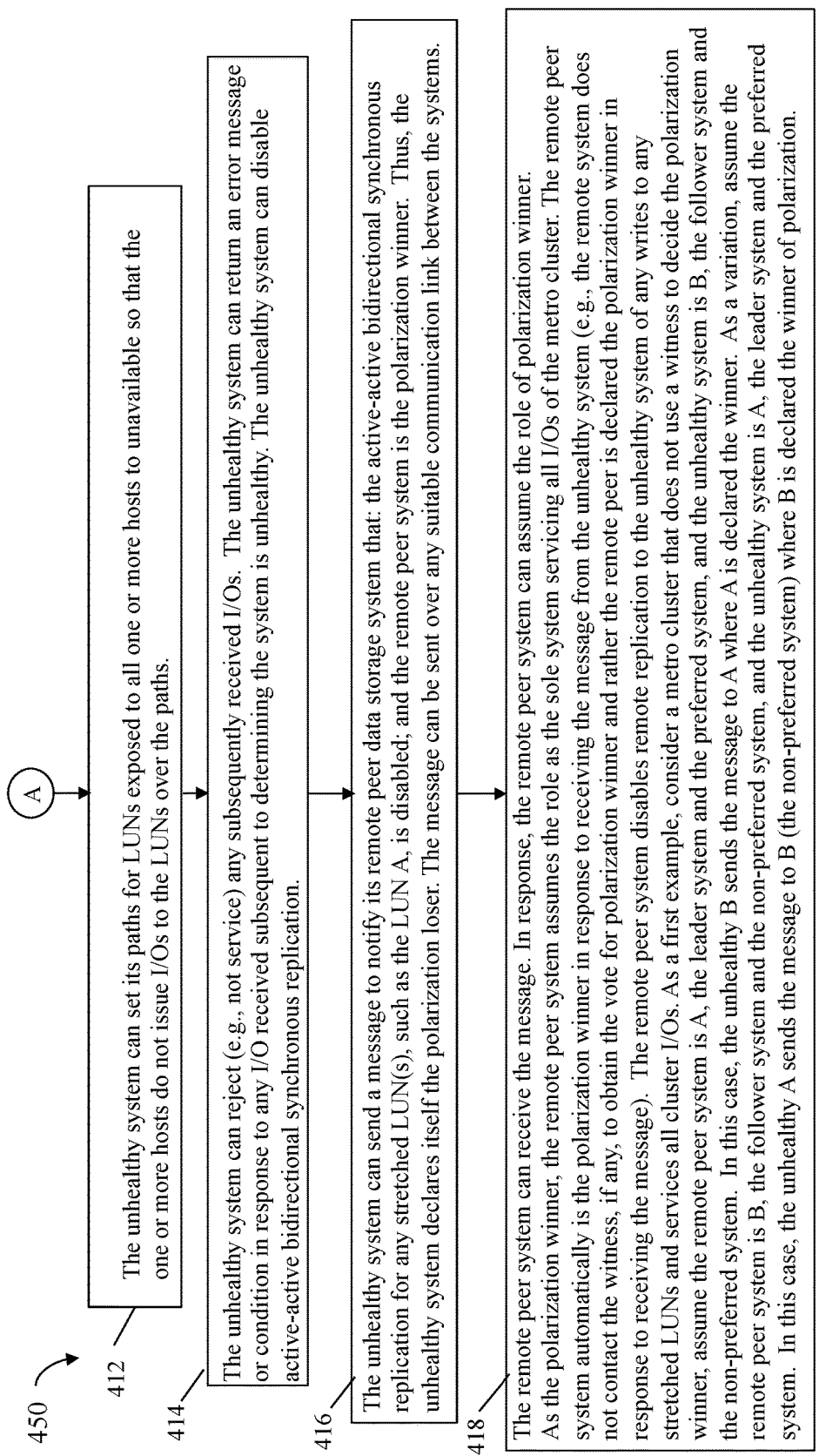

Referring to FIGS. 7A and 7B, shown are processing steps 400, 450 of a flowchart that can be performed in an embodiment in accordance with the techniques of the present disclosure with or without use of a witness in deciding the polarization winner.

At the step 402, processing can be performed to configure a metro cluster including two data storage systems and one or more stretched LUNs, such as the stretched LUN A discussed above. The metro cluster can be maintained and managed using the TTL mechanism or technique and may or may not use a witness. One of the systems, such as system A, can be designated the preferred system that is the leader system, and the other system B can be the non-preferred system that is the follower system that requests TTL grants for metro cluster membership from the leader system. The system B can request from the system A a TTL grant which generally provides system B with metro cluster membership that expires at a future point in time. The system B can repeatedly issue requests to the system A for new additional TTL grants upon expiration of its TTL grant, or some amount of time prior to the TTL expiration time denoting B's membership in the metro cluster. From the step 402, control proceeds to the step 404.

At the step 404, processing can be periodically performed to assess or examine the health of each data storage system. In at least one embodiment, this health assessment can be performed internally by each of the data storage systems (e.g., each system can perform a self-health assessment), or alternatively, by another component or system that is external with respect to the data storage system. In at least one embodiment, the health assessment processing for a system can include determining whether the system is experiencing one or more internal system failures such as, for example, one or more of the internal system failures a-g discussed above. An embodiment can also more generally define other conditions denoting whether a system is unhealthy. From the step 404, control proceeds to the step 406.

At the step 406, based on the health assessment of a data storage system, a current state of each data storage system can be determined as unhealthy or healthy. In at least one embodiment, the system can be deemed unhealthy if the system is experiencing one or more internal system failures and/or other conditions denoting an unhealthy state. The internal system failures can be predetermined or defined and can include, for example, the internal system failures a-g described above. If the system is not experiencing one of the internal system failures, or more generally, defined conditions denoting an unhealthy system state, the system can be deemed healthy. From the step 406, control proceeds to the step 408.

The step 408 can be performed by each of the two data storage systems A and B of the metro cluster configuration in at least one embodiment. In the step 408, each of the systems A and B can determined whether it is unhealthy based on the processing of the steps 404 and 406. If the step 408 for one of the systems determines that the system is unhealthy, control proceeds to the step 410. Otherwise if the step 408 evaluates to no for the system where the system is healthy, control proceeds to the step 404.

At the step 410, generally the unhealthy system stops requesting TTLs or stops granting TTLs, depending on whether the unhealthy system is the leader system or the follower system. If the unhealthy system is A, the leader system, the system A stops granting any subsequent TTL requests to the system B. If the unhealthy system is B, the follower system, the system B stops issuing any subsequent TTL requests to the system A to renew system B's TTL grant. From the step 410, control proceeds to the step 412.

At the step 412, the unhealthy system can set its paths for LUNs exposed to all one or more hosts to "unavailable" so that the one or more hosts connected to the unhealthy system do not issue I/Os to the LUNs exposed to any hosts over the unavailable paths. The unavailable status of paths to the unhealthy system for exposed LUNs can be communicated to the one or more hosts in any suitable manner. In at least one embodiment, a host can determine that a path to the unhealthy system over which a LUN is exposed is unavailable by the unhealthy system rejecting any I/Os issued from the host to the unhealthy system over such unavailable paths. As a variation in at least one embodiment, the unavailable status of the paths can be sent to the host in response to the host issuing one or more commands to the unhealthy system. From the step 412, control proceeds to the step 414.

At the step 414, the unhealthy system can reject any subsequently received I/Os. The unhealthy system can return an error message or condition in response to any I/O received subsequent to determining the system is unhealthy. In at least one embodiment, the rejected I/Os are those I/O received on paths to the unhealthy system identified as unavailable in the step 412. As part of step 414, the unhealthy system can disable active-active replication for stretched LUNs (e.g., disable bi-directional synchronous replication) so that subsequent writes to either system are no longer replicated to the remote peer system. From the step 414, control proceeds to the step 416.

At the step 416, the unhealthy system can send a message to notify its remote peer data storage system that: the active-active bidirectional synchronous replication for any stretched LUN(s), such as the LUN A, is disabled; and the remote peer system is the polarization winner. Thus, the unhealthy system declares itself the polarization loser. The message can be sent over any suitable communication link between the systems. From the step 416, control proceeds to the step 418.

At the step 418, the remote peer system can receive the message sent from the unhealthy system in the step 416. In response, the remote peer system can assume the role of polarization winner. As the polarization winner, the remote peer system assumes the role as the sole system servicing all I/Os of the metro cluster. The remote peer system automatically is the polarization winner in response to receiving the message from the unhealthy system (e.g., the remote system does not contact the witness, if any, to obtain the vote for polarization winner and rather the remote peer is declared the polarization winner in response to receiving the message). The remote peer system disables active-active bidirectional synchronous replication so that there is no remote replication to the unhealthy system of any writes to any stretched LUNs and the remote peer services all cluster I/Os (e.g., disables active-active replication). As a first example, consider a metro cluster that does not use a witness to decide the polarization winner, assume the remote peer system is A, the leader system and the preferred system, and the unhealthy system is B, the follower system and the non-preferred system. In this case, the unhealthy B sends the message to A where A is declared the winner. As a variation, assume the remote peer system is B, the follower system and the non-preferred system, and the unhealthy system is A, the leader system and the preferred system. In this case, the unhealthy A sends the message to B (the non-preferred system) where B is declared the winner of polarization.

In some instances, the remote peer system may not receive the message (e.g., sent in the step 416) from the unhealthy system. The remote peer system may not receive the message, for example, due to a failed connection or communication link failure where that particular connection or link was used by the unhealthy system to send the message. More generally, the remote peer system may not receive the message from the unhealthy system for any one of a variety of reasons. In at least one embodiment, if the remote peer system does not receive the message from the unhealthy system, the remote peer system will eventually trigger polarization where the polarization winner can be selected as the preferred system as discussed above. Thus if the remote peer system is the preferred system, the remote peer system becomes the polarization winner. Otherwise, the remote peer system is non-preferred and declares itself the polarization loser and the unhealthy system is the polarization winner.

To illustrate the former case, assume the remote peer system is A—the leader system and the preferred system—and the unhealthy system is B—the follower system and non-preferred system. Assume further that the remote peer system A does not receive the message sent in the step 416 from the unhealthy system B. In this case, the current TTL of the system B eventually expires where A tracks and is aware of B's TTL expiration (since B does not request any subsequent TTLs). In response to not receiving any requests from B for a new TTL grant and B's current TTL expires, A can trigger polarization processing and declare itself the polarization winner since A is the preferred system.

As a variation to illustrate the latter case, assume the remote peer system is B—the follower system and the non-preferred system—and the unhealthy system is A—the leader system and preferred system. Assume further that the remote peer system B does not receive the message sent in the step 416 from the unhealthy system A. In this case, the current TTL of the system B eventually expires and B issues a request for a new TTL to A. However, B does not receive a response from A to its TTL request and triggers polarization. In this case, B declares itself the polarization loser since it is non-preferred and A is declared the polarization winner since A is the preferred system.

In at least one embodiment, the one-sided polarization algorithm processing as described above in connection with FIGS. 7A and 7B can be executed internally on each of the two data storage systems of the metro cluster configuration. As a variation, in at least one embodiment, the one-sided polarization algorithm processing as described above can be executed externally with respect to the two data storage systems. For example, the one-sided polarization algorithm can be executed by a third site or system that communicates with the two data storage systems. The third site or system can be any suitable component or system. In a metro cluster configuration without a witness where the third site or system runs the one-sided polarization algorithm the third site or system can be connected to the other two systems in a manner similar to the witness as in FIG. 6 but where the third site functions as the control component running the one-side polarization algorithm rather than function as a witness.

What will now be described is the second algorithm, algorithm B, sometimes referred to as an improved polarization algorithm for use with a witness in deciding the polarization winner. In at least one embodiment in a metro cluster configuration such as illustrated in FIG. 6 with a witness, the second algorithm can be utilized. In at least one embodiment, the improved polarization algorithm, algorithm B, as described below in connection with FIGS. 8A-8E can be performed in a metro cluster configuration as illustrated in FIG. 6 which uses a witness for selecting a polarization winner. In such an arrangement of FIG. 6 with a witness as discussed above, the polarization winner can be determined as the system which is the first system to request and obtain the vote of the witness. Additionally, the preferred system can be given a time advantage in requesting to obtain the witness's vote, where non-preferred system can wait an intentional or artificial time delay prior to contacting the witness. In accordance with the techniques of the present disclosure, yet another additional time delay can be added to the amount of time a system waits to contact the witness if the system is determined as unhealthy.

Figure 8A:
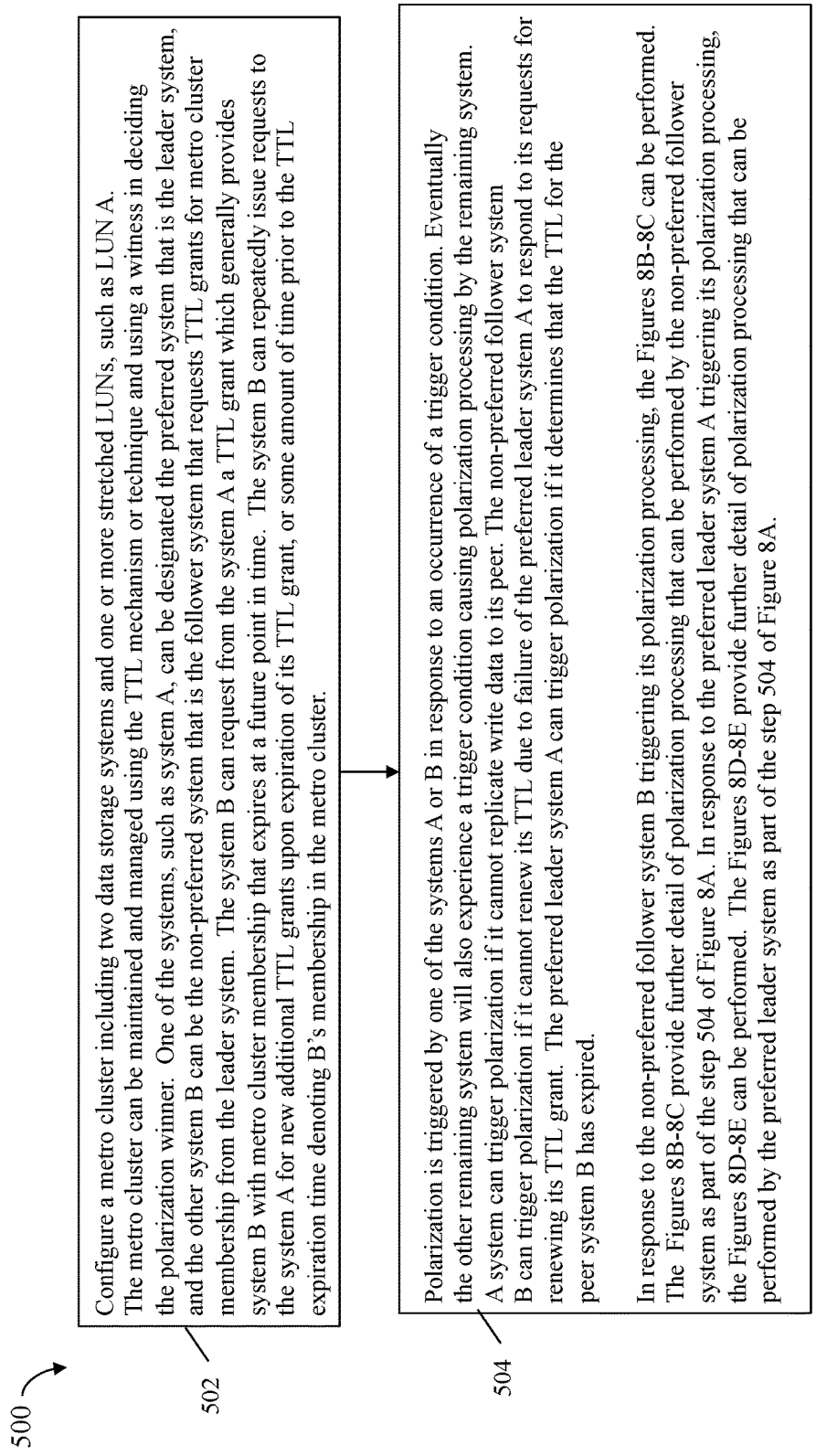

Referring to FIG. 8A, shown is a flowchart 500 of processing steps that can be performed in at least one embodiment of a metro cluster configuration using a witness to determine a polarization winner in accordance with techniques of the present disclosure.

At the step 502, processing can be performed to configure a metro cluster including two data storage systems and one or more stretched LUNs, such as LUN A. The metro cluster can be maintained and managed using the TTL mechanism or technique and also using a witness in deciding the polarization winner. One of the systems, such as system A, can be designated the preferred system that is the leader system, and the other system B can be the non-preferred system that is the follower system that requests TTL grants for metro cluster membership from the leader system. The system B can request from the system A a TTL grant which generally provides system B with metro cluster membership that expires at a future point in time. The system B can repeatedly issue requests to the system A for new additional TTL grants upon expiration of its TTL grant, or some amount of time prior to the TTL expiration time denoting B's membership in the metro cluster. From the step 502, control proceeds to the step 504.

At the step 504, polarization is triggered by one of the systems A or B in response to an occurrence of a trigger condition. Eventually, the other remaining system will also experience a trigger condition causing polarization processing by the remaining system. A system can trigger polarization, for example, when it cannot replicate write data to its peer. The non-preferred follower system B can trigger polarization, for example, when it cannot renew its TTL due to failure of the preferred leader system A to respond to its requests for renewing its TTL grant. The preferred leader system A can trigger polarization, for example, when it determines that the TTL for the peer system B has expired. In response to the non-preferred follower system B triggering its polarization processing, the FIGS. 8B-8C can be performed. The FIGS. 8B-8C described below provide further detail of polarization processing that can be performed by the non-preferred follower system as part of the step 504 of FIG. 8A. In response to the preferred leader system A triggering its polarization processing, the FIGS. 8D-8E can be performed. The FIGS. 8D-8E described below provide further detail of polarization processing that can be performed by the preferred leader system as part of the step 504 of FIG. 8A. In at least one embodiment, in most cases, both systems will be responding to a polarization trigger within a few seconds, and therefore the non-preferred follower system B may execute the steps in FIGS. 8B-8C at or around the same time that the preferred leader system A is executing the steps in FIGS. 8D-8E.

Figure 8B:
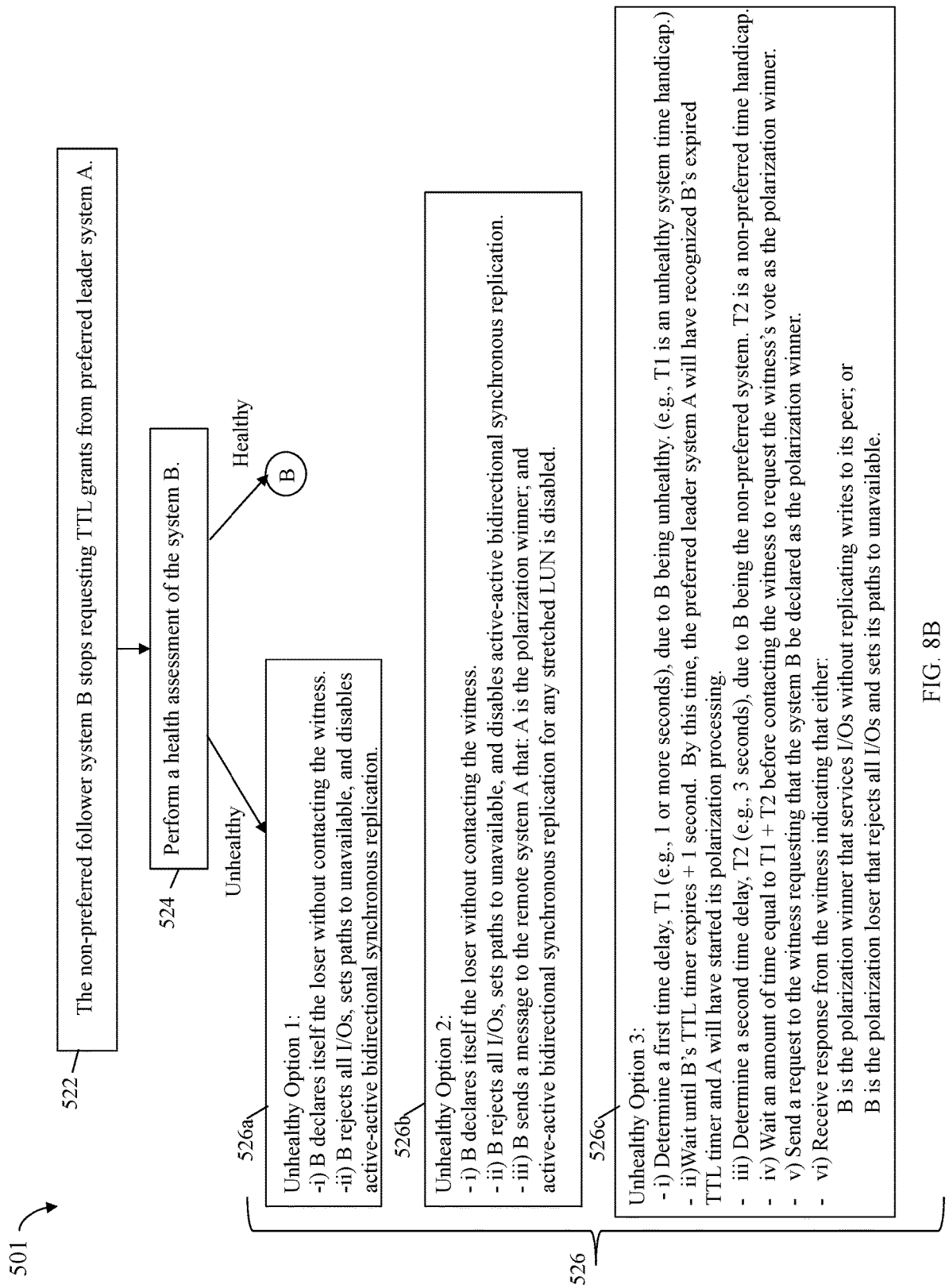
Figure 8C:
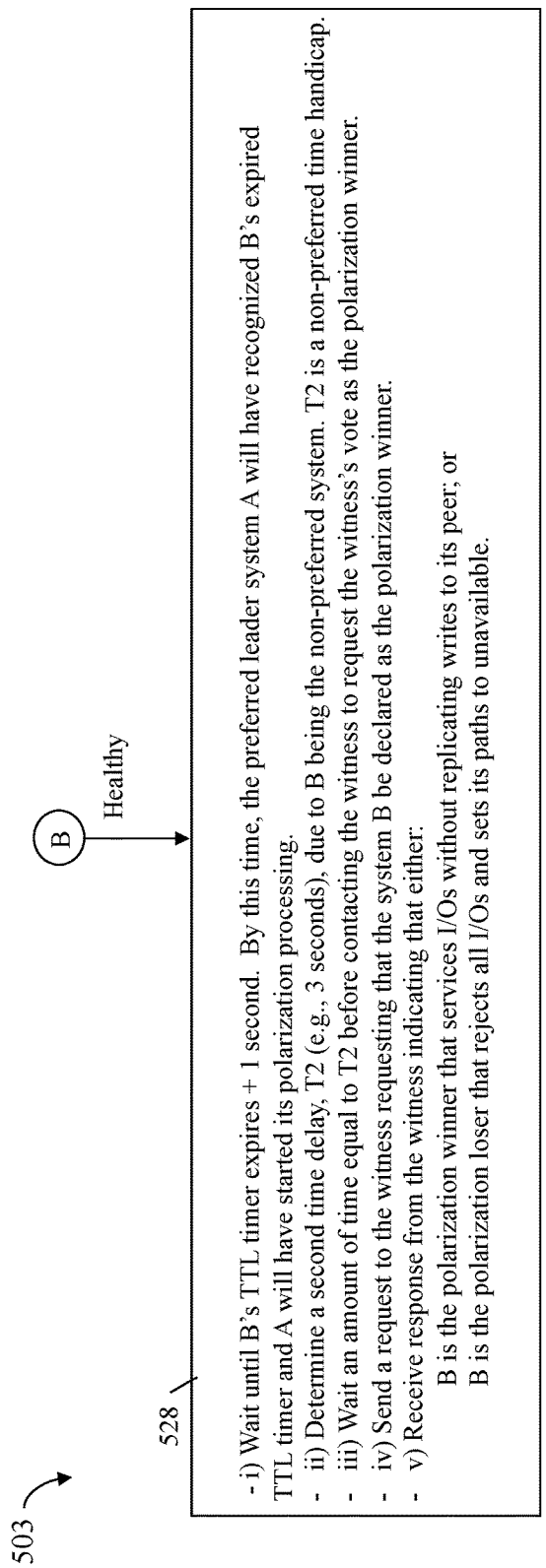

Referring to FIGS. 8B-8C, shown are processing steps 501, 503 of a flowchart of polarization processing that can be performed by the non-preferred follower system B in at least one embodiment in accordance with techniques of the present disclosure. Consistent with other discussion herein, if the non-preferred follower system B detects the occurrence of a trigger condition, the system B performs polarization processing of FIGS. 8B-8C. For example, if the non-preferred follower system B determines that it is unable to replicate write data for a stretched LUN to its peer system A, or its TTL timer has expired (e.g., due to inability to receive a timely grant or response to a TTL request sent to the system A), the system B performs polarization processing of FIGS. 8B-8C.

At the step 522, the non-preferred follower system B stops requesting TTL grants from the preferred leader system A. From the step 522, control proceeds to the step 524.

At the step 524, a health assessment of the system B is performed. This health assessment can be performed internally by the system B itself, or another component connected to the system B. In at least one embodiment, a system can be determined as unhealthy as described above, for example, in connection with the steps 404 and 406 of FIG. 7A. In at least one embodiment, a system can be determined as unhealthy if it is experiencing one of the internal system failures a-g discussed above.

If the system B is determined at the step 524 to be unhealthy, control proceeds to the step 526. In at least one embodiment in the step 526, one of the 3 options 526a-c can be selected as a processing option. In at least one embodiment, any one or more of the options 526a-c can be implemented. Thus, in embodiments which implement only a single one of the options 526a-c, there is no selection made among multiple ones of the options 526a-c. Alternatively, in at least one embodiment, two or three of the options 526a— can be implemented such that a particular one of the available or implemented options can be selected in the step 526.

If the option 526a is selected or otherwise implemented as the sole option in the step 526, the following processing can be performed:
  i) B declares itself the loser without contacting the witness.
  ii) B rejects all I/Os, sets the status of paths to the system B to be unavailable and disables active-active bidirectional synchronous replication.

If the option 526b is selected or otherwise implemented as the sole option in the step 526, the following processing can be performed:
  i) B declares itself the loser without contacting the witness.
  ii) B rejects all I/Os, sets the status of paths to the system B to be unavailable and disables active-active bidirectional synchronous replication.
  iii) B sends a message to the remote system A that: A is the polarization winner; and active-active bidirectional synchronous replication for any stretched LUN is disabled.

If the option 526c is selected or otherwise implemented as the sole option in the step 526, the following processing can be performed:
  i) B determines a first time delay, T1 (e.g., 1 or more seconds), due to B being unhealthy. (e.g., T1 is an unhealthy system time handicap).
  ii) B waits until B's TTL timer expires+1 second. By this time, the preferred leader system A will have recognized B's expired TTL timer and A will have started its polarization processing.
  iii) B determines a second time delay, T2 (e.g., 3 seconds), due to B being the non-preferred system. T2 is a non-preferred time handicap.
  iv) B waits an amount of time equal to T1+T2 before contacting the witness to request the witness's vote as the polarization winner.
  v) B sends a request to the witness requesting that the system B be declared as the polarization winner.
  vi) B receives a response from the witness indicating that either:
    B is the polarization winner that services I/Os without replicating writes to its peer; or
    B is the polarization loser that rejects all I/Os and sets its paths to unavailable.

If the system B is determined at the step 524 to be healthy, control proceeds to the step 528. At the step 528, the following processing can be performed:
  i) B waits until B's TTL timer expires+1 second. By this time, the preferred leader system A will have recognized B's expired TTL timer and A will have started its polarization processing.
  ii) B determines a second time delay, T2 (e.g., 3 seconds), due to B being the non-preferred system. T2 is a non-preferred time handicap.

iii) B waits an amount of time equal to T2 before contacting the witness to request the witness's vote as the polarization winner.
iv) B sends a request to the witness requesting that the system B be declared as the polarization winner.
v) B receives a response from the witness indicating that either:
  B is the polarization winner that services I/Os without replicating writes to its peer; or
  B is the polarization loser that rejects all I/Os and sets its paths to unavailable.

Figure 8D:
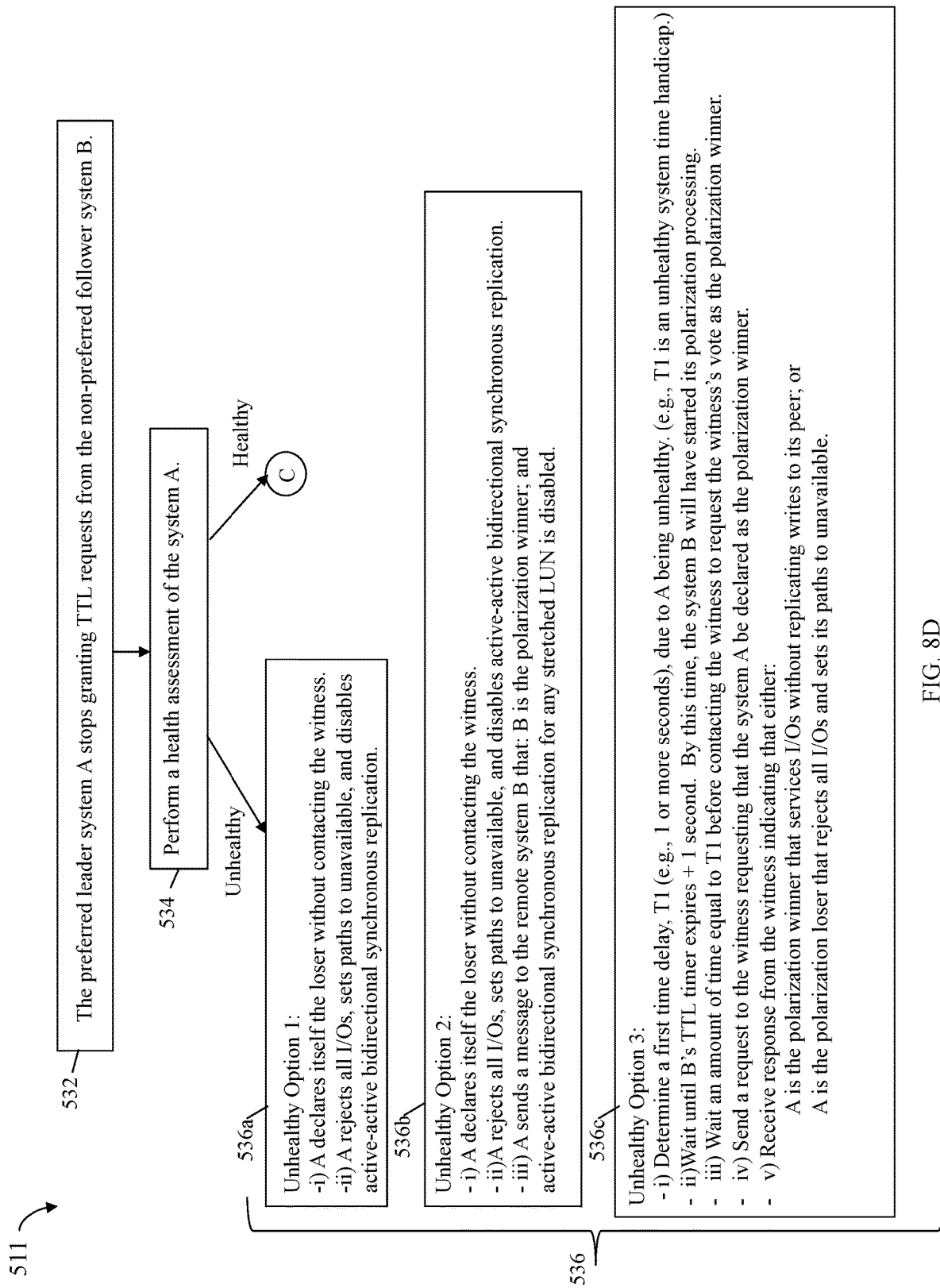
Figure 8E:
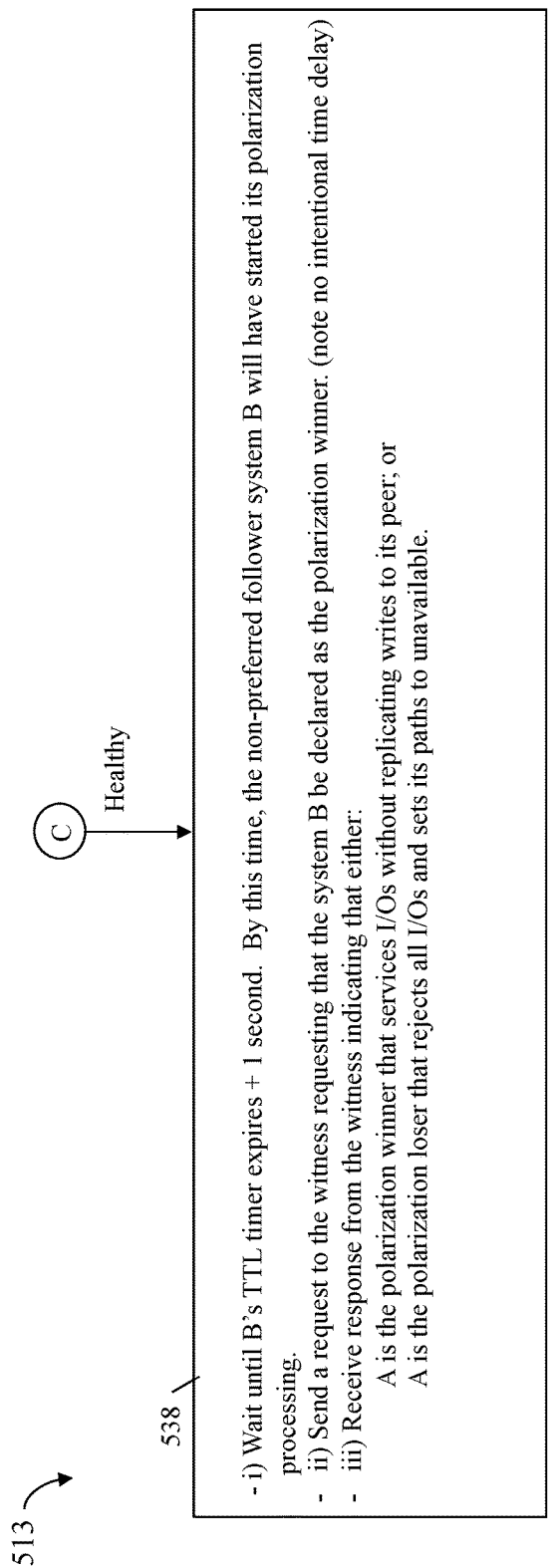

Referring to FIGS. 8D-8E, shown are processing steps 511, 513 of a flowchart of polarization processing that can be performed by the preferred leader system A in at least one embodiment in accordance with techniques of the present disclosure. Consistent with other discussion herein, if the preferred leader system A determines that it is unable to replicate write data for a stretched LUN to its peer system B, or it determines that the B's TTL timer has expired (e.g., has not received and granted a TTL request to the system B), the system A performs polarization processing of FIGS. 8D-8E.

At the step 532, the preferred leader system A stops granting TTL requests from the non-preferred follower system B. From the step 532, control proceeds to the step 534.

At the step 534, a health assessment of the system A is performed. This health assessment can be performed internally by the system A itself, or another component connected to the system A. In at least one embodiment, a system can be determined as unhealthy as described above, for example, in connection with the steps 404 and 406 of FIG. 7A. In at least one embodiment, a system can be determined as unhealthy if it is experiencing one of the internal system failures a-g discussed above.

If the system A is determined at the step 534 to be unhealthy, control proceeds to the step 523. In at least one embodiment in the step 536, one of the 3 options 536a-c can be selected as a processing option. In at least one embodiment, any one or more of the options 536a-c can be implemented. Thus, in embodiments which implement only a single one of the options 536a-c, there is no selection made among multiple ones of the options 536a-c. Alternatively, in at least one embodiment, two or three of the options 536a— can be implemented such that a particular one of the available or implemented options can be selected in the step 536.

If the option 536a is selected or otherwise implemented as the sole option in the step 536, the following processing can be performed:
  i) A declares itself the loser without contacting the witness.
  ii) A rejects all I/Os, sets the status of paths to the system A to be unavailable, and disables active-active bidirectional synchronous replication.

If the option 536b is selected or otherwise implemented as the sole option in the step 536, the following processing can be performed:
  i) A declares itself the loser without contacting the witness.
  ii) A rejects all I/Os, sets the status of paths to the system A to be unavailable, and disables active-active bidirectional synchronous replication.
  iii) A sends a message to the remote system B that: B is the polarization winner; and
  active-active bidirectional synchronous replication for any stretched LUN is disabled.

If the option 536c is selected or otherwise implemented as the sole option in the step 536, the following processing can be performed:
  i) A determines a first time delay, T1 (e.g., 1 or more seconds), due to A being unhealthy. (e.g., T1 is an unhealthy system time handicap).
  ii) A waits until B's TTL timer expires+1 second. By this time, the system B will have started its polarization processing.
  iii) A waits an amount of time equal to T1 before contacting the witness to request the witness's vote as the polarization winner.
  iv) A sends a request to the witness requesting that the system A be declared as the polarization winner.
  v) A receives a response from the witness indicating that either:
    A is the polarization winner that services I/Os without replicating writes to its peer; or
    A is the polarization loser that rejects all I/Os and sets its paths to unavailable.

If the system A is determined at the step 534 to be healthy, control proceeds to the step 538. At the step 538, the following processing can be performed:
  i) A waits until B's TTL timer expires+1 second. By this time, the non-preferred follower system B will have started its polarization processing.
  ii) A sends a request to the witness requesting that the system B be declared as the polarization winner. (note no intentional time delay).
  iii) A receives a response from the witness indicating that either:
    A is the polarization winner that services I/Os without replicating writes to its peer; or
    A is the polarization loser that rejects all I/Os and sets its paths to unavailable.

In at least one embodiment, the non-preferred follower system B can independently and internally perform processing in connection with FIGS. 8B-8C; and the preferred leader system A can independently and internally perform processing in connection with FIGS. 8D-8E. Alternatively, one or more other components or systems connected to the systems A and B can perform the processing described above in connection with FIGS. 8B-8E.

What will now be described is the third algorithm C that can be performed by a control component or system with control software executing thereon. The control software can perform the processing described in connection with the flowchart of FIG. 9 to detect an unhealthy system and then, responsive to detecting an unhealthy system, disabling the active-active configuration (e.g., active-active bidirectional synchronous replication) including disabling the write data replication between the two system of the metro cluster configured for synchronous replication of writes for stretched LUNs. In at least one embodiment, the control component or system can be a separate system or component configured to communicate with the two data storage systems of the metro cluster configuration. The control software can be used in connection with a metro cluster configuration as in FIG. 5 that does not use a witness in determining a polarization winner, and also in connection with a metro cluster configuration as in FIG. 6 that does use a witness in determining a polarization winner.

Figure 9:
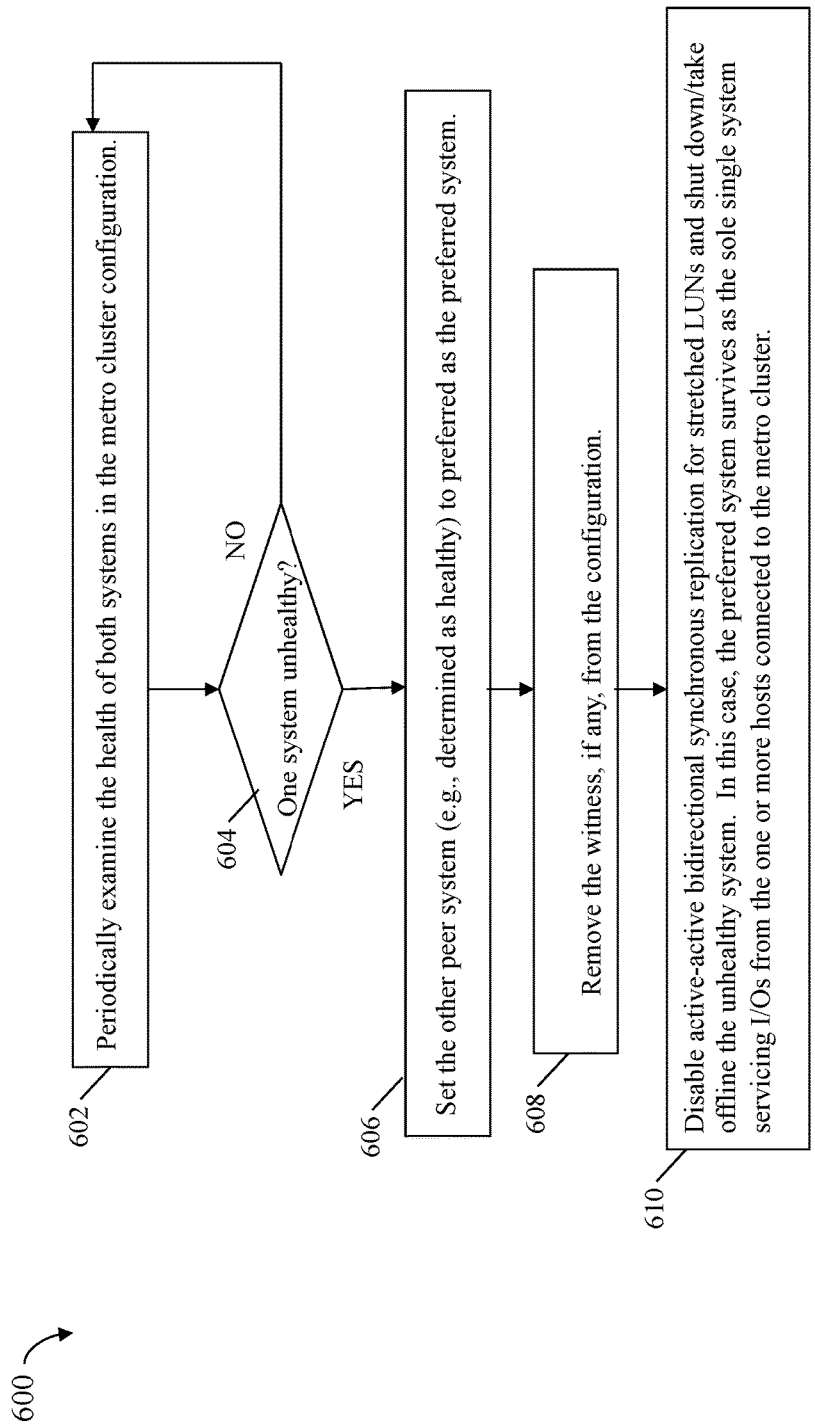

Referring to FIG. 9, shown is a flowchart 600 of processing steps that can be performed by a control component or system in an embodiment in accordance with the techniques of the present disclosure.

At the step 602, the control component can periodically examine the health of both data storage systems of the metro cluster configuration. The status of each system as healthy or unhealthy can be determined as discussed above, for example, in connection with FIGS. 7A-7B. From the step 602, a determination is made as to whether one of the data storage systems is determined to be unhealthy. If the step 604 evaluates to no, control proceeds to the step 602. If the step 604 evaluates to yes, control proceeds to the step 606.

At the step 606, processing can be performed to set the other peer data storage system (e.g., determined as healthy) to preferred thereby denoting the peer data storage system as the preferred system. From the step 606, control proceeds to the step 608.

At the step 608, processing can be performed to remove the witness, if any, from the configuration. From the step 608, control proceeds to the step 610.

At the step 610, processing can be performed to disable active-active bidirectional synchronous replication for stretched LUNs. The step 610 can also include performing processing to shut down or take offline the unhealthy data storage system. In this case, the preferred data storage system survives as the sole single data storage system servicing I/Os from the one or more hosts connected to the metro cluster.

In connection with the embodiments discussed above, the metro cluster membership can be managed and maintained using the TTL mechanism with the unidirectional TTL grant-request where the leader system grants TTL requests to the follower system. More generally, any suitable technique can be used to manage and maintain the cluster. For example, as a variation in at least one embodiment, the metro cluster membership can be managed and maintained using the TTL mechanism with a bidirectional TTL grant request. With the bidirectional TTL grant request, there is generally a two way TTL grant request where each system continually issues a TTL grant to its remote peer system. In the event a system does not receive a TTL grant from its peer, the system can trigger performing its polarization processing.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
configuring a stretched volume from two volumes of two data storage systems configured as a cluster, wherein each of the two volumes is included in a different one of the two data storage systems, wherein the two volumes configured as the stretched volume are exposed to a host as a same logical volume having a same first identifier over a plurality of paths from the two data storage systems, wherein the two volumes are configured for bidirectional synchronous replication between the two data storage systems whereby a write directed to the stretched volume received at any one of the two data storage systems is synchronously replicated to the other one of the two data storage systems of the cluster;
determining, while write data is replicated between the two data storage systems in accordance with the bidirectional synchronous replication, that a first of the two data storage systems is unhealthy; and
responsive to determining that the first data storage system is unhealthy while write data is replicated between the two data storage systems in accordance with the bidirectional synchronous replication, performing first processing including:
disabling the bidirectional synchronous replication between the two data storage systems; and
notifying, by the first data storage system, a second of the two data storage systems that the second data storage system is selected as a single survivor system to service I/O requests directed to the stretched volume without replicating write requests to the first data storage system.

2. The computer-implemented method of claim 1, wherein said determining the first data storage system is unhealthy includes determining that the first data storage system is experiencing an internal system failure.

3. The computer-implemented method of claim 2, wherein the internal system failure of the first data storage system is one of a plurality of defined system failures, and wherein the plurality of defined system failures includes one or more of:
a first defined system failure resulting in the first data storage system not able to service write requests and able to service read requests for existing data stored on the first data storage system;
a second defined system failure resulting in the first data storage system not able to service read requests to read existing data stored on the first data storage system and able to service write requests; and
a third defined system failure resulting in the first data storage system not being able to service any I/O operations.

4. The computer-implemented method of claim 3, wherein the first defined system failure is any of:
an out of disk space failure where the first data storage system has no free or available non-volatile back-end storage for storing new data;
an out of cache storage failure where the first data storage system cannot service new writes since there is no available cache to store new data written by the new writes; and
an out of journal or log space failure where the first data storage system cannot service new writes since the new writes cannot be recorded in a log.

5. The computer-implemented method of claim 3, wherein the second defined system failure is any of:
a double disk failure in a RAID-5 disk layout of non-volatile back-end storage, where the first data storage system services new writes by writing new data to healthy non-volatile back-end storage, and where the first data storage system has existing data stored on failed non-volatile back-end storage that cannot be read or recovered; and a metadata corruption of metadata used to access stored data on non-volatile back-end storage, where the metadata used to access the stored data is corrupted and cannot be used to retrieve the stored data, and where the metadata is used to map a logical address to its corresponding physical address on non-volatile back-end storage.

6. The computer-implemented method of claim 3, wherein the third defined system failure is any of:
an internal network failure resulting in the first data storage system being unable to access non-volatile back-end storage including stored data and metadata; and
a double node failure within the first data storage system where no processor is available to service I/O requests.

7. The computer-implemented method of claim 1, wherein the cluster uses a time-to-live (TTL) mechanism by which a preferred one of the two data storage systems communicates permission for continued operation in the cluster to a non-preferred one of the two data storage systems in response to TTL requests from the non-preferred data storage system.

8. The computer-implemented method of claim 7, wherein the first data storage system is the preferred data storage system, the second data storage system is the non-preferred data storage system, and the TTL mechanism includes a TTL timer at the non-preferred data storage system which is refreshed by each grant of TTL permission from the preferred data storage system, and a corresponding tracking timer at the preferred data storage system tracks operation of the TTL timer.

9. The computer-implemented method of claim 8, wherein the first processing includes:
the first data storage system, as the preferred data storage system, not granting any TTL requests sent from the second data storage system as the non-preferred data storage system; and
the first data storage system rejecting and not servicing I/O operations received.

10. A system comprising:
one or more processors; and
a memory comprising code stored therein that, when executed, performs a method comprising:
configuring a stretched volume from two volumes of two data storage systems configured as a cluster, wherein each of the two volumes is included in a different one of the two data storage systems, wherein the two volumes configured as the stretched volume are exposed to a host as a same logical volume having a same first identifier over a plurality of paths from the two data storage systems, wherein the two volumes are configured for bidirectional synchronous replication between the two data storage systems whereby a write directed to the stretched volume received at any one of the two data storage systems is synchronously replicated to the other one of the two data storage systems of the cluster, wherein the two data storage systems include a first data storage system and a second data storage system, and wherein the two data storage systems are in communication with a witness; and
responsive to detecting an occurrence of a trigger condition, triggering first polarization processing for the first data storage system, wherein said first polarization processing includes:
determining that the first data storage system is unhealthy; and
responsive to determining that the first data storage system is unhealthy, performing first processing including:
declaring that the first data storage system is a loser of polarization without contacting the witness;
disabling the bidirectional synchronous replication between the two data storage systems;
the first data storage system rejecting received I/Os; and
setting paths to the first data storage system over which one or more volumes including the stretched volume are exposed to unavailable.

11. The system of claim 10, wherein the first processing further includes:
sending a message from the first data storage system to the second data storage system, wherein the message sent from the first data storage system to the second data storage system indicates that the second data storage system is a winner of polarization whereby the second data storage system is designated as a single surviving system of the cluster that services I/Os, and wherein the message indicates that bidirectional synchronous replication for any configured stretched volume including the stretched volume is disabled.

12. The system of claim 10, wherein the cluster uses a time-to-live (TTL) mechanism by which a preferred one of the two data storage systems communicates permission for continued operation in the cluster to a non-preferred one of the two data storage systems in response to TTL requests from the non-preferred data storage system.

13. The system of claim 12, wherein the first data storage system is the preferred data storage system, and the first processing includes the first data storage system not granting any TTL requests received from the second data storage system, which is the non-preferred data storage system, and wherein the trigger condition is expiration of the TTL granted to the second data storage system or failure to replicate writes of the stretched volume from the first data storage system to the second data storage system.

14. The system of claim 12, wherein the first data storage system is the non-preferred data storage system, and the first processing includes the first data storage system not sending any TTL requests to the second data storage system, which is the non-preferred data storage system, and wherein the trigger condition includes failure to replicate writes of the stretched volume from the first data storage system to the second data storage system or expiration of the TTL granted to the first data storage system due to failure to receive a renewed TTL grant response from the second data storage system.

15. The system of claim 10, wherein said determining the first data storage system is unhealthy includes determining that the first data storage system is experiencing an internal system failure that is one of a plurality of defined system failures, and wherein the plurality of defined system failures includes one or more of:
a first defined system failure resulting in the first data storage system not able to service write requests and able to service read requests for existing data stored on the first data storage system;
a second defined system failure resulting in the first data storage system not able to service read requests to read existing data stored on the first data storage system and able to service write requests; and a third defined system failure resulting in the first data storage system not being able to service any I/O operations.

16. A non-transitory computer readable medium comprising code stored thereon that, when executed, performs a method comprising:
configuring a stretched volume from two volumes of two data storage systems configured as a cluster, wherein each of the two volumes is included in a different one of the two data storage systems, wherein the two volumes configured as the stretched volume are exposed to a host as a same logical volume having a same first identifier over a plurality of paths from the two data storage systems, wherein the two volumes are configured for bidirectional synchronous replication between the two data storage systems whereby a write directed to the stretched volume received at any one of the two data storage systems is synchronously replicated to the other one of the two data storage systems of the cluster, wherein the two data storage systems include a first data storage system and a second data storage system, wherein the cluster uses a time-to-live (TTL) mechanism by which a preferred one of the two data storage systems communicates permission for continued operation in the cluster to a non-preferred one of the two data storage systems in response to TTL requests from the non-preferred data storage system, and wherein the first data storage system is designated as the non-preferred data storage system and wherein the second data storage system is designated as the preferred data storage system; and
responsive to detecting an occurrence of a trigger condition, triggering first polarization processing for the first data storage system, wherein said first polarization processing includes:
determining that the first data storage system is unhealthy; and
responsive to determining that the first data storage system is unhealthy, performing first processing including:
determining a first intentional time delay due the first data storage system being unhealthy;
determining a second intentional time delay due to the first data storage system being designated as the non-preferred data storage system;
waiting until expiration of the TTL of the first data storage system plus a specified amount of time;
responsive to waiting until expiration of the TTL of the first data storage system plus the specified amount of time, waiting an amount of time equal to the first intentional time delay and the second intentional time delay prior to sending a request to a witness requesting that the first data storage system be declared a polarization winner;
responsive to waiting the amount of time, sending the request to the witness requesting that the first data storage system be declared a polarization winner; and
responsive to said request, receiving a response from the witness, wherein the response indicates whether the first data storage system is the polarization winner selected as a sole surviving system to service I/Os without replicating writes of the stretched volume to the second data storage system, or a polarization loser that is evicted from the cluster and rejects I/Os.

17. The non-transitory computer readable medium of claim 16, wherein the first processing includes the first data storage system not sending any TTL requests to the second data storage system, which is the preferred data storage system, and wherein the trigger condition includes failure to replicate writes of the stretched volume from the first data storage system to the second data storage system or expiration of the TTL granted to the first data storage system, and wherein the method further includes:
responsive to detecting an occurrence of the trigger condition, triggering second polarization processing for the second data storage system, wherein said second polarization processing includes:
determining that the second data storage system is not unhealthy;
sending a second request to the witness requesting that the second data storage system be declared the polarization winner; and
responsive to said second request, receiving a second response from the witness, wherein the second response indicates whether the second data storage system is the polarization winner or the polarization loser that is evicted from the cluster and rejects I/Os.

18. The non-transitory computer readable medium of claim 16, wherein said determining the first data storage system is unhealthy includes determining that the first data storage system is experiencing an internal system failure that is one of a plurality of defined system failures, and wherein the plurality of defined system failures includes one or more of:
a first defined system failure resulting in the first data storage system not able to service write requests and able to service read requests for existing data stored on the first data storage system;
a second defined system failure resulting in the first data storage system not able to service read requests to read existing data stored on the first data storage system and able to service write requests; and
a third defined system failure resulting in the first data storage system not being able to service any I/O operations.

* * * * *